United States Patent
van Houten et al.

(10) Patent No.: US 9,709,447 B2
(45) Date of Patent: Jul. 18, 2017

(54) THERMAL ENERGY METERING USING AN ENTHALPY SENSOR

(71) Applicant: AQUANTA INC., McLean, VA (US)

(72) Inventors: Arnoud Bruins Jan van Houten, Reston, VA (US); Evan Fair Johnson, Washington, DC (US)

(73) Assignee: AQUANTA INC., McLean, VA (US)

( * ) Notice: Subject to any disclaimer, the term of this patent is extended or adjusted under 35 U.S.C. 154(b) by 291 days.

(21) Appl. No.: 14/248,302

(22) Filed: Apr. 8, 2014

(65) Prior Publication Data

US 2015/0285690 A1 Oct. 8, 2015

(51) Int. Cl.
| | | |
|---|---|---|
| G01K 3/00 | (2006.01) | |
| G01K 7/16 | (2006.01) | |
| G01K 3/06 | (2006.01) | |
| G01K 3/10 | (2006.01) | |

(52) U.S. Cl.
CPC ............... *G01K 7/16* (2013.01); *G01K 3/06* (2013.01); *G01K 3/10* (2013.01)

(58) Field of Classification Search
CPC .............. G01K 7/16; G01K 3/10; G01K 3/06
See application file for complete search history.

(56) References Cited

U.S. PATENT DOCUMENTS

| | | | |
|---|---|---|---|
| 4,969,749 A | | 11/1990 | Hasselmann |
| 4,977,385 A | * | 12/1990 | McQueen ............... G01F 1/684 29/611 |
| 5,221,916 A | * | 6/1993 | McQueen ............... G01F 1/002 219/544 |
| 5,282,386 A | * | 2/1994 | Niemczyk ........... F16H 57/0447 340/459 |
| 7,520,445 B2 | | 4/2009 | Feinleib et al. |
| 7,798,140 B2 | | 9/2010 | van Houten |
| 9,188,463 B2 | * | 11/2015 | Olechnowicz |

(Continued)

FOREIGN PATENT DOCUMENTS

| | | |
|---|---|---|
| EP | 0286193 A2 | 10/1988 |
| EP | 1336828 A1 | 8/2003 |

(Continued)

OTHER PUBLICATIONS

"FAQ, Troubleshooting and Support Guide," Downloaded from <http://ohm.sunnovations.com/assets/ohm_troubleshooting_guide.pdf>, Undated (3 pgs.).

(Continued)

*Primary Examiner* — Lisa Caputo
*Assistant Examiner* — Janice M Soto
(74) *Attorney, Agent, or Firm* — Wilmer Cutler Pickering Hale and Dorr LLP

(57) ABSTRACT

Apparatus and methods are provided for thermal energy metering by measuring the average temperature of fluid in a tank, such as a hot water storage tank. Average temperature is measured with an elongated temperature sensor wire that can span the vertical height of the tank. The sensor wire can be protected with a waterproofing jacket. The sensor wire can be coupled to a second substantially parallel wire. A processing unit measures temperature from changes in the resistance of the sensor wire and measures rates of change to allow the system to distinguish different sources of heat increase and/or decrease.

20 Claims, 13 Drawing Sheets

(56) References Cited

U.S. PATENT DOCUMENTS

| | | | |
|---|---|---|---|
| 2004/0233034 A1 | 11/2004 | Bernier | |
| 2008/0099414 A1 | 5/2008 | Haslem | |
| 2009/0315727 A1* | 12/2009 | Goltenboth | H05B 6/645 340/586 |
| 2010/0083952 A1* | 4/2010 | van Houten | F24D 17/0021 126/678 |
| 2013/0173205 A1* | 7/2013 | Van Houten | G01K 3/06 702/136 |

FOREIGN PATENT DOCUMENTS

| WO | WO-8805160 A1 | 7/1988 |
|---|---|---|
| WO | WO-2013103702 A2 | 7/2013 |

OTHER PUBLICATIONS

"New Monitoring System Tracks Performance of Solar Water Heaters," Downloaded from <http://www.proudgreenhome.com/article/211335/New-monitoring-system-tracks-performance-of-solar-water-heaters>, Apr. 11, 2013 (2 pgs.).

"OHM Installation & Owner's Manual," Downloaded from <http://ohm.sunnovations.com/assets/ohm_installation_owners_manual.pdf>, Undated (19 pgs.).

"OHM Solar Thermal Energy Monitoring System," Product Specification Sheet Downloaded from:<http://ohm.sunnovations.com/assets/ohm_product_specification_sheet.pdf>, Undated (2 pgs.).

"OHM System Leverages Patent-Pending Sensor Technology, Enabling Near-Universal Applicability," Downloaded from:<http://sunnovations.com/content/sunnovations-introduces-ohm-new-approach-solar-hot-water-monitoring-0>, Apr. 9, 2013 (2 pgs.).

"Report No. R1-SNV120827-011 on Solar Thermal System Testing According to Customized Test Program," Downloaded from <http://ohm.sunnovations.com/assets/tuv_june_2013_ohm_test_report.pdf>, Jun. 4, 2013 (13 pgs.).

"Sunnovations Introduces New Approach to Solar Hot Water Monitoring: Ohm System Leverages Patent-Pending Sensor Technology, Enabling Near-Universal Applicability," Downloaded from <http://www.prweb.com/releases/ohm/launch/prweb10613550.htm>, Apr. 9, 2013 (2 pgs.).

"Sunnovations Releases Solar Hot Water Monitoring System," Downloaded from <http://solarprofessional.com/articles/products-equipment/product-launches/sunnovations-releases-solar-hot-water-monitoring-system>, Oct.-Nov. 2013 (2 pgs.).

"Sunnovations Unveils Ohm Solar Hot Water Monitoring System," Solar Industry Magazine, Downloaded from http://www.solarindustrymag.com/e107_plugins/content/content.php?content.12457#.UWcJNmBw_J4, Apr. 9, 2013 (1 pg.).

"The Ohm Monitoring System by Sunnovations. Bringing Solar Water Heating into the 21st Century," Product Brochure Downloaded from: <http://ohm.sunnovations.com/assets/ohm_shw_monitoring_brochure.pdf>, 2013 (3 pgs.).

"The Ohm Monitoring System: Bringing Solar Water Heating Into the 21st Century," Product Homepage Downloaded from <http://ohm.sunnovations.com/> (2013). Downloaded on May 5, 2014 (4 pgs.).

Burch, et al, "Field Monitoring of Solar Domestic Hot Water Systems Based on Simple Tank Temperature Measurement," Proceedings of the American Solar Energy Society Annual Conference, Golden, Colorado, May 1995 (9 pgs.).

Burch, et al., "Diagnosis of Solar Water Heaters Using Solar Storage Tank Surface Temperature Data," Proceedings of the American Solar Energy Society Annual Conference, Buffalo, New York, May 2009 (11 pgs.).

Marken, C. "Sunnovations' Ohm SWH Production Meter," Downloaded from <http://www.homepower.com/articles/solar-water-heating/equipment-products/sunnovations%E2%80%99-ohm-swh-production-meter>, Last updated Oct. 26, 2013 (1 pg.).

Trabish, H., "Will Sunnovations' Monitoring System Boost the Prospects of Solar Hot Water?" Downloaded from a. <http://www.greentechmedia.com/articles/read/Will-Sunnovations-Monitoring-System-Win-Homeowners-to-Solar-Hot-Water> (Apr. 9, 2013) (5 pgs.).

Van Houten, A. and Carlson, M., "New Enthalpy Method for Solar Thermal Metering: Accurate, Reliable, Low Cost & Easy Installation," Presented at Solar Power Int'l, Chicago, IL <http://67.192.213.85/2013/Public/SessionDetails.aspx?FromPage=SpeakerList.aspx&SessionID=376&SortMenu=102001> (Oct. 23, 2013) (1 pg.).

Video: "Ohm Installation Training Video," Available at https://www.youtube.com/watch?v=zalKI9_Tkdl, Apr. 8, 2014.

Video: "Ohm—Solar Hot Water Monitoring," Available at <https://www.youtube.com/watch?v=qJIHF8KUngQ>, Apr. 8, 2014.

Wang, U., "Sunnovations Launches Monitoring Tools for Solar Water Heating," Downloaded from <http://www.renewableenergyworld.com/rea/news/article/2013/04/sunnovations-launches-monitoring-tools-for-solar-water-heating?cmpid=WNL-Wednesday-April10-2013>, Apr. 9, 2013 (6 pgs.).

International Search Report and Written Opinion Issued by the U.S. Patent and Trademark Office as International Searching Authority for International Application No. PCT/US2013/020123 mailed Dec. 20, 2013 (11 pgs.).

International Search Report and Written Opinion issued by the U.S. Patent and Trademark Office as International Searching Authority for International Application No. PCT/US2015/24643 mailed Jul. 20, 2015 (11 pgs.).

* cited by examiner

FIG. 14

THERMAL ENERGY METERING USING AN ENTHALPY SENSOR

FIELD OF THE DISCLOSURE

The present disclosure relates generally to improving thermal energy metering using an enthalpy sensor and, more particularly, to techniques for thermal energy metering of a hot water storage tank, and in particular those used in solar water heating applications.

BACKGROUND OF THE DISCLOSURE

Solar hot water tanks gain energy from solar-powered energy sources in addition to conventional, auxiliary energy sources, and the tanks lose energy from water use and heat loss to the surrounding environment. Homeowners and other users of solar hot water tanks want to measure the performance and cost-savings that may be attributed to using solar power.

Conventional systems typically attempt to monitor solar hot water tanks by relying on flow meters combined with temperature sensor-pairs placed in the "solar loop" portion of a solar hot water tank. These systems use the flow rate and temperature differential to derive a measurement of solar energy put into the hot water tank. However, these systems are expensive, inaccurate, and hard-to-install. For example, these systems only provide an indirect measurement of energy input.

Therefore, there is a need for providing cost-effective, accurate, and easy-to-install thermal energy metering present a variety of challenges. Improved systems for thermal energy metering are described in U.S. Application Publication No. 2013/0173205, U.S. Provisional Application No. 61/582,642, and International Application Publication No. 2013/103702 A2, which are hereby incorporated by reference.

BRIEF SUMMARY

Embodiments of the present disclosure include practical, low-cost enthalpy sensor designs for accurately monitoring energy flows in hot water storage tanks (e.g., solar hot water storage tanks).

Systems and methods for thermal energy metering include the use of a sensor wire mounted within a waterproofing jacket and coupled to a processing unit for determining temperature based on changes in the resistance of the sensor wire.

Systems and methods are also provided for providing a universal sensor wire configured to be provided with a second wire of lower resistivity to be provided in a tank, and with a processing unit for determining temperature based on changes in the resistance of the sensor wire. In this case, the sensor wire can extend in one direction a length greater than a tank height, and the processing unit can compensate for the length. In this embodiment, the sensor wire and second wire can be mounted in a spool such that a desired length is cut for use.

Systems and methods are also provided for providing for using a sensor wire with a processing unit for determining temperature based on changes in the resistance of the sensor wire. The processing unit can be configured to analyze changes in the resistance and determine a source of increase or decrease in temperature.

Other features and advantages will become apparent from the following detailed description and drawings.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

FIG. 14 shows a diagram of state-change events in accordance with an embodiment of the present disclosure.

DETAILED DESCRIPTION OF EMBODIMENTS

Figure 1:
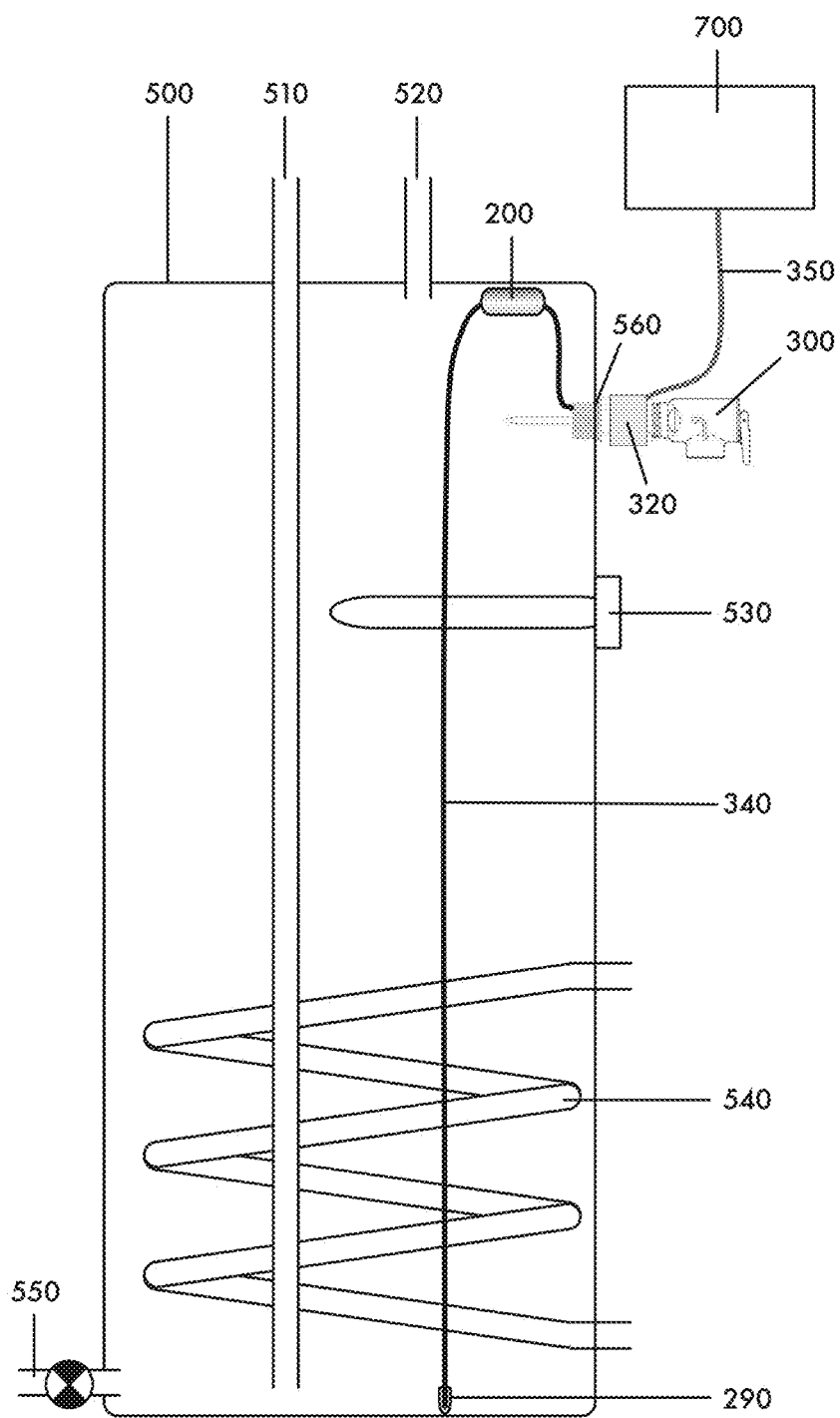
FIG. 1 shows a schematic representation of a tank with an enthalpy sensor in accordance with an embodiment of the present disclosure.

When thermal energy is transferred to fluid in a storage tank, the average temperature of the fluid in the tank will rise. One example is a solar hot water system that collects thermal solar energy via collectors and stores the thermal energy in fluid in a storage tank for later use. The change in the average temperature increase over a certain time period is directly proportional to the amount of energy transferred to the fluid in the tank according to the following mathematical relationship:

$$Q = m \cdot C_p \cdot \Delta T, \text{ whereby:}$$

Q is the amount of heat lost or gained measured in, e.g., Joules;

m is the mass of the fluid in the storage tank;

$C_p$ is the heat capacity of the fluid (e.g., approximately 4.183 J/g·K for liquid water at typical operating temperatures and pressure, and varies depending on the change in temperature of the system); and $\Delta T$ is the change in temperature (e.g., average tank temperature) over the measurement period measured in, e.g., degrees Kelvin.

The mass of the fluid in the storage tank can fluctuate according to the thermal expansion of a fluid as it heats up. For example, a 300-liter (i.e., nearly 80-gallon) tank heats up from 5° C. to 85° C., almost 5 liters (over 1 gallon) of fluid will be displaced; this displacement, which changes the mass of the fluid in the tank, may be considered for accurate calculation. Changes to $C_p$ may be considered for accurate calculation. One exemplary technique for determining current values of $C_p$ may be to look up the value for a corresponding tank temperature in a digitally-stored table. The digitally-stored table may be adjusted or otherwise calibrated for accurate calculation. The value of $\Delta T$ can be accurately represented by an enthalpy sensor, using a measured resistive value as the output of the enthalpy sensor. For an enthalpy sensor constructed of a given material, it may be determined what the response in change in resistance will be per degree Kelvin (or Celsius) change in temperature.

Using the formula above can provide an accurate calculation of the energy changes in a tank, which can be reported as a value in a variety of units, such as Joules (J), watt-hours (Wh), British thermal unit (BTU), etc. This formula offers an accurate method for metering energy in such a system.

An enthalpy sensor according to the embodiments described herein can take advantage of the physical property that the electrical resistance of materials (e.g., metals, semiconductors, etc.) changes proportionally to temperature changes in that material. For example, the resistivity of an elongated enthalpy sensor changes proportionally to the average temperature changes in that material. Additionally, a sensor that covers substantially an entire vertical height of the liquid-holding portion of a tank from bottom to top (e.g., 80% or more, or 90% or more) can measure the average temperature of the fluid in the tank, even if the temperature difference between the bottom and top of the tank is large, and even though the temperature stratification over the height of the tank is non-linear. For example, there may be a layer of relatively hot fluid higher within the tank than a layer of relatively cold water. Nevertheless, the tank has an average temperature measurable by an elongated enthalpy sensor according to embodiments of the disclosure. A tank could be as little as about 0.5 m high, but would more typically be at least about 1.2 m (approximately 4 feet) or more, and often 1.5 m, or 1.6 m. For tanks other than residential solar systems, a tank could be much greater in height.

FIG. 1 shows a schematic representation of a hot water storage tank 500 with cold water inlet 510, hot water outlet 520, drain port 550, and electrical heating element 530. Gas, oil, or other energy sources for auxiliary heat can also be used. The hot water storage tank 500 of FIG. 1 is shown with an optional heat exchanger 540, which is often used in solar thermal systems. An elongated enthalpy sensor 340 is shown along the vertical dimension of the tank. The entire vertical section of the elongated enthalpy sensor 340 acts as a line-averaging resistor measuring device for measuring the average tank temperature accurately. Float 200 and weight 290 attached to the elongated enthalpy sensor 340 orient the elongated enthalpy sensor 340 in a vertical orientation from a position at or near the top of the hot water storage tank 500 to a position at or near the bottom of the hot water storage tank 500. For easy installation, the elongated enthalpy sensor 340 is inserted through a Temperature and Pressure (T&P) port 560 using a fitting 320 that couples to the T&P port 560 and a T&P valve 300. The fitting 320 is designed with externally-threaded and internally-threaded ends so it can be easily installed in the T&P port 560, and the T&P valve 300 can be easily re-installed. In other embodiments, the elongated enthalpy sensor 340 may be installed through other parts of a tank (e.g., fluid inlets or outlets), or the elongated enthalpy sensor 340 may be connected to an exterior wall of the tank. Sensor cable 350 provides electrical connection between the elongated enthalpy sensor 340 and sensor controller 700.

Figure 2:
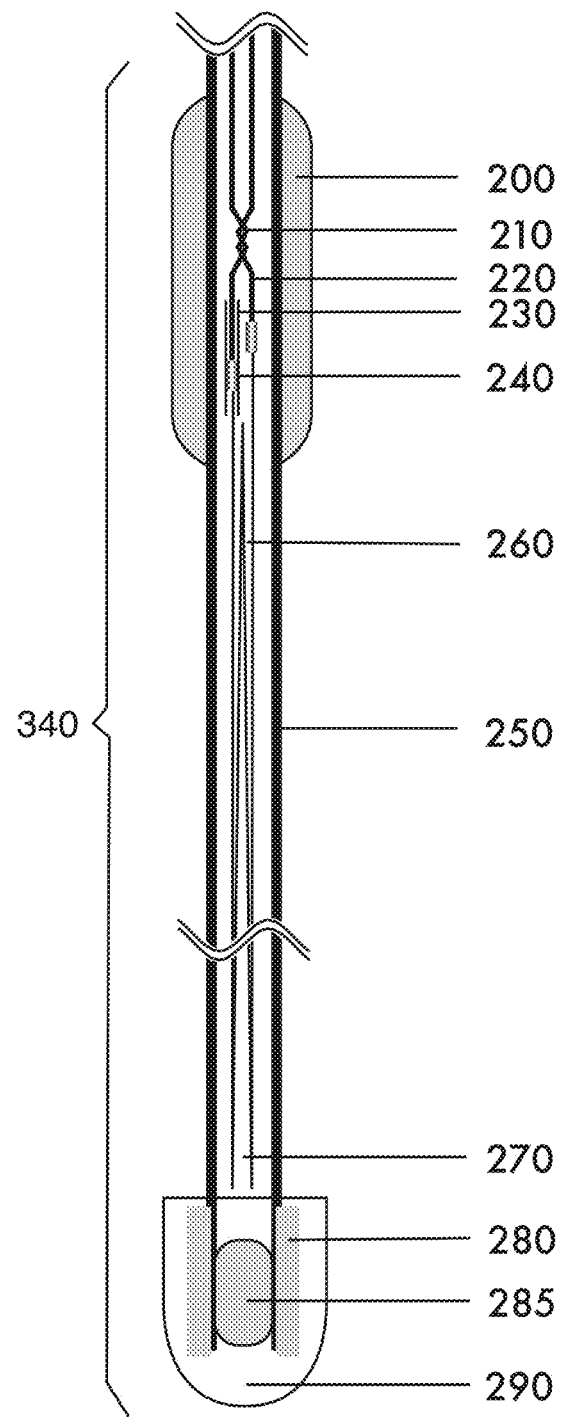
FIG. 2 depicts a cross-sectional view of an enthalpy sensor in accordance with an embodiment of the present disclosure.

FIG. 2 shows a cross-sectional view of elongated enthalpy sensor 340. As shown in FIG. 2, elongated enthalpy sensor 340 may comprise several components, including sensor wire 260. Sensor wire 260 is made of thin wire with high strength, high electrical resistance, and high electrical temperature coefficient (e.g., stainless steel). Sensor wire 260 is coated with a thin insulation layer to prevent one portion of sensor wire 260 from electrical contact with another portion of sensor wire 260 that may otherwise cause short-circuiting in the system.

A known current or voltage can be provided from a power supply to the wire. Because the resistance changes as a function of the temperature in a known manner for a given wire, the temperature can be sensed based on the resistance provided by the wire. Wires of a material with low electrical resistance (e.g., copper wire of resistance less than 2Ω), including connection cables, terminals, and connectors, offer some challenges. For example, the electrical temperature coefficient of a wire is relative to the total resistance of the wire, which, in the case of a copper wire, would be rather low (e.g., 0.001Ω). A sensor wire of a material such as copper with a low electrical resistivity may require more expensive electronics to accurately measure relatively smaller changes in temperature, and the supply voltage may be kept low (e.g., 0.05 V) to avoid high currents which may burn the wire and cause internal heat-up. Hence a sensor wire with higher electrical resistance (and higher resistivity) is desired. In some embodiments, it may be possible to coil a relatively long and thin copper wire on a long mandrill, or to create a (flexible) printed circuit board with a long and thin copper trace to create a copper wire-based sensor with relatively high resistance. Regardless of material, in some embodiments, the sensor wire (e.g., sensor wire 260) may have a higher range of resistance (e.g., between approximately 250-600Ω, or, more particularly, between approximately 350-505Ω) so the total length of sensor wire 260 can be limited to about one to four times the height of a typical tank (e.g., approximately 4-6 feet tall, or 1.2-1.8 m), while avoiding the aforementioned problems that occur in relatively short wires with relatively low range of resistance.

Sensor wire 260 is depicted in a "W" shape over the length of the elongated enthalpy sensor 340: a first end of sensor wire 260 is connected near a top portion of the elongated enthalpy sensor 340. The sensor wire 260 proceeds toward a bottom portion of the elongated enthalpy sensor 340 and bends back up toward the top portion to form the first half of the "W" shape. The sensor wire bends again back down toward the bottom portion and once again bends back up toward the top portion to form the second half of the "W" shape. A second end of the sensor wire 260 is also connected near the top portion of the elongated enthalpy sensor 340. In other embodiments, the sensor wire 260 may be configured in a "U" or "V" shape (i.e., the first half of the "W" shape only). In each of these cases, the wire is substantially linear, extends along a distance greater than the height of the tank, and has both ends of the wire at the top.

Sensor wire 260 is configured over the length of elongated enthalpy sensor 340 to offer desired electrical resistance. Mechanical crimp junctions, such as mechanical crimp junction 240, connect each end of the sensor wire 260 to a copper lead wire with lower electrical resistance and resistivity, such as copper lead wire 220. The crimp connectors have insulating jackets, such as insulating jacket 230, to avoid electrical contact between the two copper lead wires. Insulated portions of the copper lead wires may be twisted together as shown in FIG. 2 at twisted portion 210 to help prevent the copper lead wires from shifting positions relative to each other.

In some embodiments, the system may automatically detect that elongated enthalpy sensor 340 is one of several possible lengths corresponding to one of several typical tank heights, e.g., "Short" (approximately four feet long), "Standard" (approximately five feet long), or "Tall" (approximately six feet long). A sensor wire of a particular length may be determined to have a particular operating range of resistance. For example, a "Short" (e.g., four-foot) elongated enthalpy sensor 340 may have a resistance between approximately 335-375Ω, a "Standard" (e.g., five-foot) elongated enthalpy sensor 340 may have a resistance between approximately 400-445Ω, and a "Tall" (e.g., six-foot) elongated enthalpy sensor 340 may have a resistance between approximately 455-505Ω. Generally, a relatively longer sensor wire undergoes a relatively greater change in resistance per degree of average temperature change. For example, the resistance of a "Standard" elongated enthalpy sensor 340 may increase by approximately 0.5 Ω/1° C. change in average temperature.

To protect sensor wire 260 and other internal components of elongated enthalpy sensor 340 from the hot, pressurized water in hot water storage tank 500, elongated enthalpy sensor 340 further comprises jacket 250. Jacket 250 may ensure higher accuracy and longer term reliable operation of the sensor. Jacket 250 may be flexible (i.e., with no mechanical memory). Because elongated enthalpy sensor 340 may be immersed in potable water, jacket 250 can be made with a food-safe material, such as an NFS-certified food-safe material meeting the required operational conditions of a hot water storage tank such as hot water storage tank 500. In one embodiment, high-grade (e.g., medical-grade), impermeable silicone tubing is used.

Furthermore, to avoid tube flattening from high water pressure outside jacket 250, and to protect from inadvertent permeation of water through jacket 250, elongated enthalpy sensor 340 includes electrically-insulated filler material 270. In one embodiment, a low-viscosity, two-component silicone may be injected under high pressure to the region inside the jacket 250 over the full length of the elongated enthalpy sensor 340.

Weight 290 may be connected to a bottom portion of elongated enthalpy sensor 340 to help orient the elongated enthalpy sensor 340 in a vertical orientation with the bottom portion of elongated enthalpy sensor 340 positioned at or near the bottom portion of hot water storage tank 500. In some embodiments, weight 290 comprises copper ferrule 280 and copper compression pin 285. Weight 290 may be configured to form a waterproof compression seal around jacket 250. Weight 290 may be enclosed by a cap such as food-safe silicone cap 290 for additional waterproofing. While the term "waterproofing" is used here, and the embodiments are described mainly in conjunction with a water tank, this term should be understood to include protecting the elongated enthalpy sensor 340 from whatever type of fluid the elongated enthalpy sensor 340 is used to sense.

Figure 7:
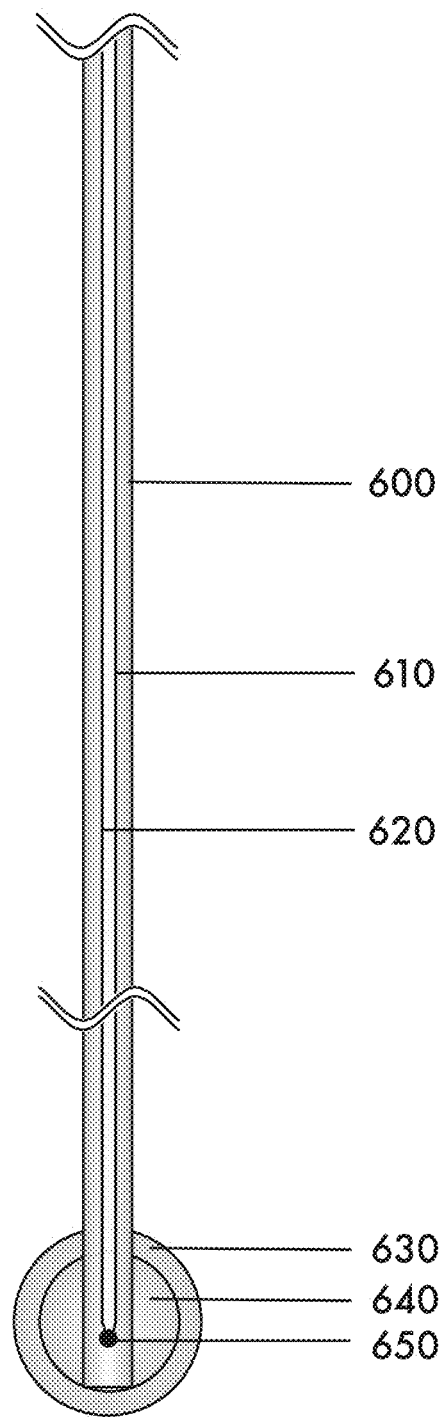
FIG. 7 shows a cross-sectional view of a universal enthalpy sensor in accordance with an embodiment of the present disclosure.

Waterproof insulation of sensor wire 260 that is resistant to long term exposure in a tank under high pressure and high temperature is preferable for accurate use, as galvanic effects due to contact with water may otherwise cause error in enthalpy sensor readings, and associated corrosion may render the sensor wire 260 defective prematurely. FIGS. 2 and 7, described in detail below, depict exemplary waterproof insulation for sensor wires.

In some embodiments, to provide measurements with improved accuracy, elongated enthalpy sensor 340 ranges from at or near a top portion of hot water storage tank 500 to a bottom portion of hot water storage tank 500. In some tanks, such as tanks where the sensor fitting is at the side of the tank lower than a top portion of the tank, techniques may be applied for positioning a top end of elongated enthalpy sensor 340 at or near a top portion of hot water storage tank 500. For example, a flotation device, such as float 200, may be used so that a top end of elongated enthalpy sensor 340 may float at or near the top portion of hot water storage tank 500.

Float 200 may be connected to a top portion of elongated enthalpy sensor 340 to help, in conjunction with weight 290, orient the elongated enthalpy sensor 340 in a vertical orientation with the top portion of the elongated enthalpy sensor 340 at or near the top portion of hot water storage tank 500. Float 200 is configured with an appropriate density and size so that float 200 can support the total mass of the elongated enthalpy sensor 340 when submerged in fluid in a tank (e.g., water in hot water storage tank 500). Float 200 is preferably made of a material that will not deform or absorb water via permeation over time due to prolonged exposure to water at high pressure and high temperatures. In some embodiments, float 200 may be made of non-compressible, impermeable, food-safe (e.g., NSF-certified), two-component epoxy with glass nano-spheres mixed in, with a density lower than the density of the fluid in the tank (e.g., lower than approximately 1 g/cm$^3$ for water, which may be adjusted for the pressure and temperature inside hot water storage tank 500), which is injection-molded in the desired shape and size around sensor wire 260. Float 200 should be narrow enough to fit through T&P port 560 (or other port, inlet, outlet, etc. through which the float will be installed) of hot water storage tank 500 and fitting 320 for easy installation. Elongated enthalpy sensor 340 is within a center portion of the body of float 200, and wire junctions such as mechanical crimp junction 240 may be located inside the body of float 200.

Figure 3:
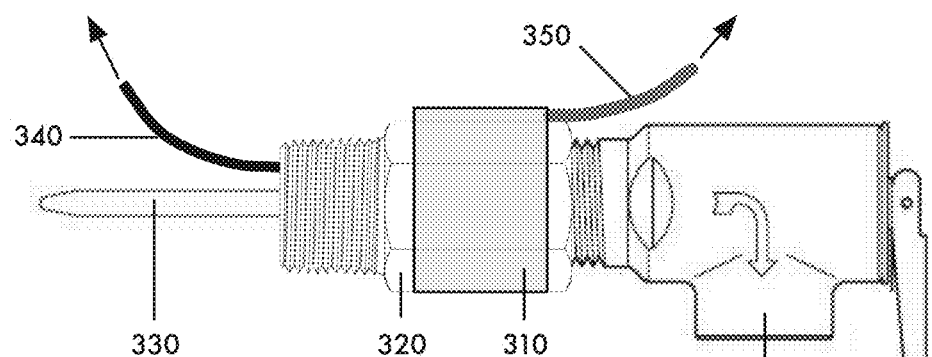
FIG. 3 shows a fitting of an enthalpy sensor connected to a temperature and pressure ("T&P") valve in accordance with an embodiment of the present disclosure.
Figure 4:
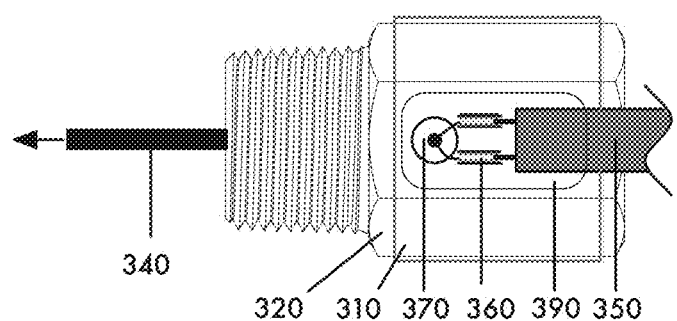
FIG. 4 shows a detail view of an enthalpy sensor fitting connected to a T&P valve in accordance with an embodiment of the present disclosure.
Figure 5:
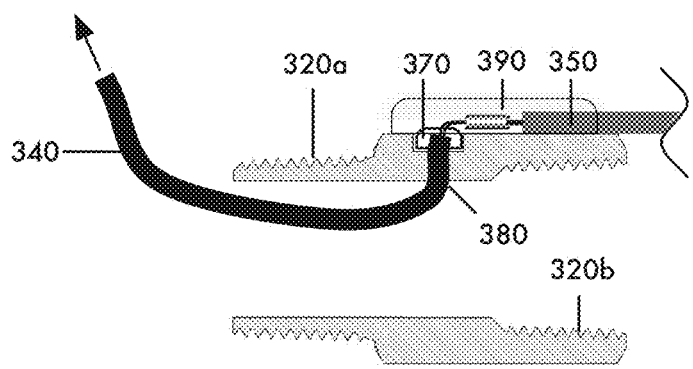
FIG. 5 shows a cross-sectional view of an enthalpy sensor fitting in accordance with an embodiment of the present disclosure.

FIGS. 3-5 show several views of sensor fitting 320 for retrofitting elongated enthalpy sensor 340 to an existing tank. In the embodiments depicted by FIGS. 3-5, sensor fitting 320 also houses electrical connections between elongated enthalpy sensor 340 and sensor cable 350 as described below.

In some embodiments, to enable easier installation of an enthalpy sensor as a retrofit to existing tanks, sensor fitting designs allow insertion into an existing port on the tank, including between the T&P port and T&P valve. One benefit to insertion between the T&P port and T&P valve is that the T&P port is a common component in hot water storage tanks, and thus may avoid a need to cut existing pipes, allowing for easier, do-it-yourself (DIY) installation.

FIG. 3 shows how elongated enthalpy sensor 340 can be retrofitted in an existing tank, such as hot water storage tank 500 (FIG. 1), without having to cut pipes connected to the hot or cold ports of a tank, such as cold water inlet 510 and hot water outlet 520 of hot water storage tank 500. One option is to use the temperature and pressure (T&P) relief valve port, such as T&P port 560 of hot water storage tank 500. Hot water storage tank 500 also has a T&P valve 300 threaded into a top portion of hot water storage tank 500 (or a top side wall of hot water storage tank 500 using standard three-quarters-inch National Pipe Thread Taper (NPT). The T&P port 560 can be easily removed after water pressure to the tank is shut off and some water is drained using the drain port 550. Elongated enthalpy sensor 340 can then be inserted in the T&P port 560. In some embodiments, shrink tubing 310 covers a portion of sensor fitting 320 to protect sensor fitting 320. Fitting 320 is configured so that it will not interfere with normal operation of the T&P port 560 and T&P valve 300. For example, temperature sensing probe 330 of the T&P valve 300 may pass through sensor fitting 320, and T&P valve 300 may still open as needed when a high pressure is detected or when a high temperature is measured by temperature sensing probe 330.

FIG. 4 (top view) and FIG. 5 (cross section view) show details of sensor fitting 320 made out of extruded brass with machined externally- and internally-threaded ports and small diameter hole 380 to accommodate elongated enthalpy sensor 340. Small diameter hole 380 provides a compression seal for elongated enthalpy sensor 340. In some embodiments, secondary seal 370, made of a two-component epoxy, provides a secondary waterproof seal. As shown in FIG. 5, sensor fitting 320 has externally-threaded port 320a that can be threaded into the T&P port 560. Sensor fitting 320 also has internally-threaded port 320b into which the T&P valve 300 can be threaded.

Wire junction 360 is made to interface with sensor cable 350 that connects via a plug, such as a standard RJ11 plug, to sensor controller 700 (FIG. 1). Sensor cable 350 is bonded and sealed to sensor fitting 320 using two-component epoxy 390.

In some embodiments, it may be necessary to know the height of hot water storage tank 500 to manufacture elongated enthalpy sensor 340 with an appropriate length for retrofitting to hot water storage tank 500. As tanks come in different sizes and heights (e.g., typically 4-6 feet high), manufacture of an appropriately-sized elongated enthalpy sensor 340 could delay shipment. Therefore, in some embodiments, an enthalpy sensor may be designed to support a "universal" length (e.g., 6.5 feet), configured to accommodate arbitrary tanks with a variety of different heights.

In another aspect of the disclosure, FIGS. 6-10 show alternative embodiments of an enthalpy sensor which has a universal length, such as universal sensor 600. Universal sensor 600 is an elongated enthalpy sensor configured so that universal sensor 600 does not have to match the height of the tank, such as hot water storage tank 500.

In some embodiments, a universal sensor, such as universal sensor 600, may include an excess portion designed to float at or near the top portion of a tank. For example, in some embodiments, universal sensor 600 may be approximately 6.5 feet. In an approximately five-foot high tank, approximately 1.5 feet of the universal sensor 600 may be an excess portion. The excess portion may contribute a predictable offset to measurements taken with universal sensor 600, such that the predictable offset may be considered for accurate measurements. For example, a sensor controller, such as sensor controller 700, may be configured with the actual tank height. Additionally, an absolute temperature sensor embedded within the fitting (e.g., temperature sensor 450 in FIG. 9) may provide sensor controller 700 with measurements of the temperature at or near the top portion of the tank. With this information, sensor controller 700 may calculate the predictable offset due to an excess portion of the sensor floating at or near the top portion of hot water storage tank 500.

Figure 6:
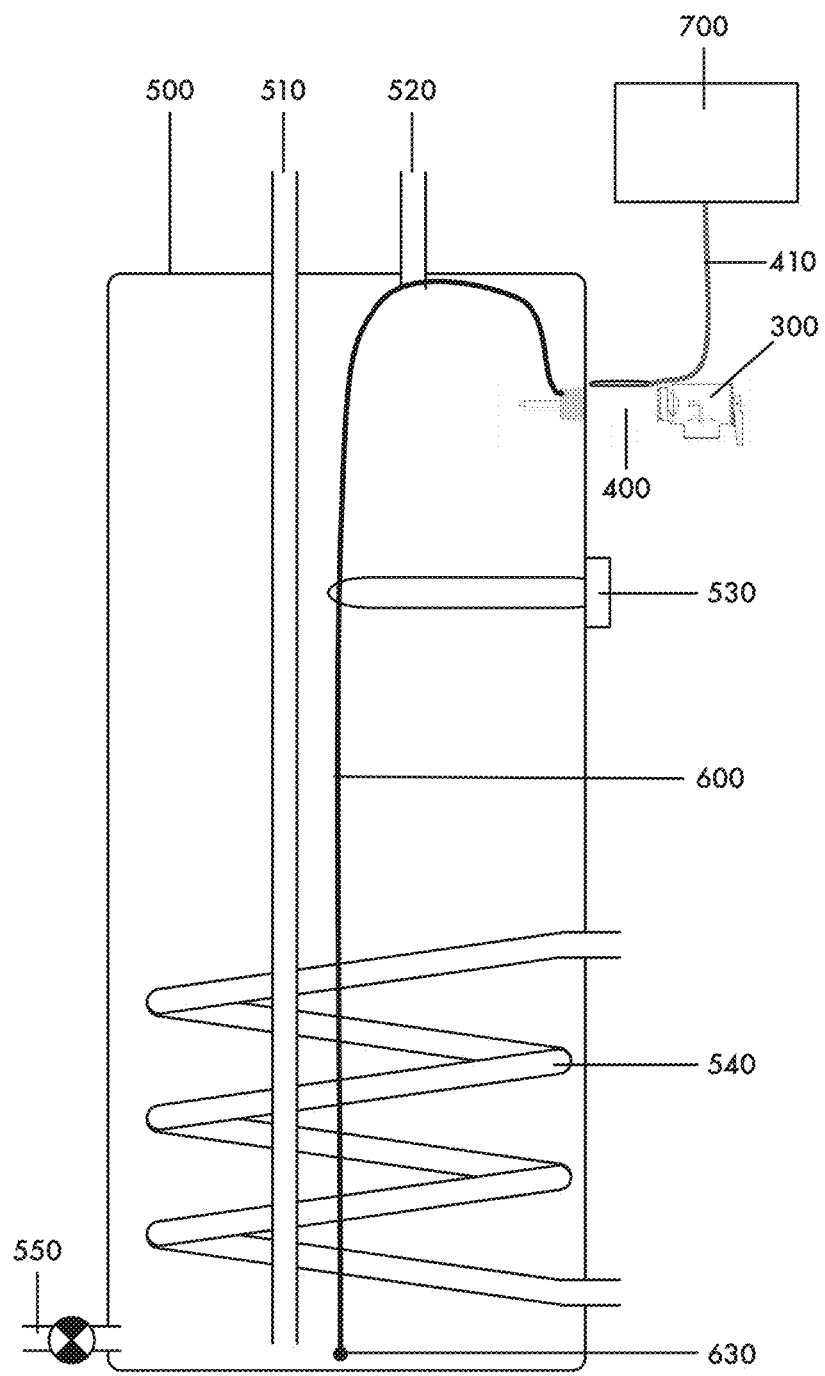
FIG. 6 depicts a schematic representation of a tank with a universal enthalpy sensor in accordance with an embodiment of the present disclosure.

FIG. 6 shows universal sensor 600 extending from a bottom portion of hot water storage tank 500 to a top portion of hot water storage tank 500, with weight 630 connected to a bottom end of universal sensor 600. A float as described above can be used, but, in some embodiments as shown in FIG. 6, no float is required because the insulation used in universal sensor 600 is made from a material that has a lower density than water (i.e., less than 1 $g/cm^3$) and floats in water in hot water storage tank 500. Weight 630 is heavy enough to pull a bottom end of universal sensor 600 toward the bottom portion of hot water storage tank 500 to orient universal sensor 600 vertically in hot water storage tank 500. An excess length of universal sensor 600 will float at or near a top portion of hot water storage tank 500. Universal sensor 600 may exit hot water storage tank 500 via universal sensor fitting 400. Universal sensor 600 connects to sensor controller 700 via universal sensor cable 410.

FIG. 7 shows an embodiment of universal sensor 600 (the low-density, floating elongated enthalpy sensor). Universal sensor 600 may be designed to be mass-produced in spool lengths. Universal sensor 600 comprises primary sensing wire 610, which may have small diameter, high strength, flexibility, high resistance, and high electrical temperature coefficient (e.g., stainless steel). Secondary wire 620 may have small diameter and low resistance (e.g., copper). Secondary wire 620 may be insulated or otherwise coated to avoid electrical contact (shorting) between primary sensing wire 610 and secondary wire 620 (or primary sensing wire 610 could be coated). In some embodiments, a primary sensing wire 610 may have no insulated coating and only secondary wire 620 may have insulated coating. Primary sensing wire 610 and secondary wire 620 are injection molded inside a polymer, which may be a rugged, low-density polymer that offers waterproofing, high flexibility, no mechanical memory, is NSF safe (i.e., food safe), and can operate under high pressure and temperature conditions to allow flotation for universal sensor 600. The diameter of universal sensor 600 is small enough to offer high flexibility but wide enough to offer sensor-wire protection and enough flotation.

An arbitrarily long length of universal sensor 600, such as a mass-produced spool length (e.g., 2000 meters) of universal sensor 600, may be cut to a smaller length (e.g., approximately 6.5 feet) to accommodate an arbitrary tank height (e.g., approximately 4 to 6.5 feet), such as the height of hot water storage tank 500. Primary sensing wire 610 and secondary wire 620 are bonded (or fused) together at a bottom end 650 of a cut portion of universal sensor 600. Bottom end 650 may be injection molded, embedding a weight 640 within a seal 630.

Figure 8:
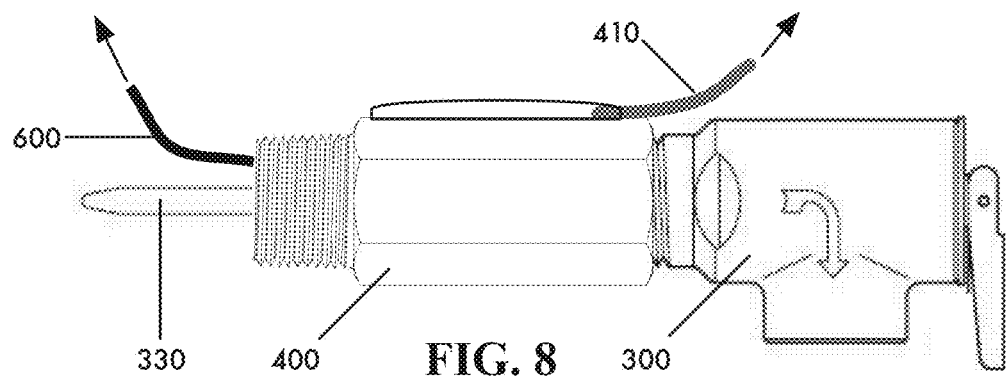
FIG. 8 shows a fitting of a universal enthalpy sensor connected to a temperature and pressure ("T&P") valve in accordance with an embodiment of the present disclosure.

FIG. 8 shows another embodiment of a sensor fitting, universal sensor fitting 400, which provides an easy-toinstall method in an existing tank, such as hot water storage tank 500, using T&P port 560. Universal sensor fitting 400 offers a watertight seal to connect universal sensor 600 to universal sensor cable 410. Universal sensor fitting 400 may be longer than sensor fitting 320 (FIGS. 3 and 4) to offer easier installation for tanks with thicker insulation. The universal length aspect of universal sensor 600 and universal sensor fitting 400 allows mass production of universal sensor 600, offering consistent quality at low material cost and labor time. As described above with respect to sensor fitting 320 (FIGS. 3 and 4), universal sensor fitting 400 is designed so that it may not interfere with temperature sensing probe 330 and normal operation of T&P valve 300 (FIGS. 1 and 6).

Figure 9:
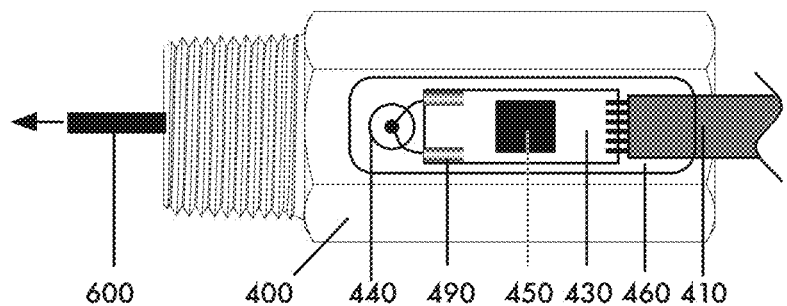
FIG. 9 shows a detail view of a universal enthalpy sensor fitting connected to a T&P valve in accordance with an embodiment of the present disclosure.
Figure 10:
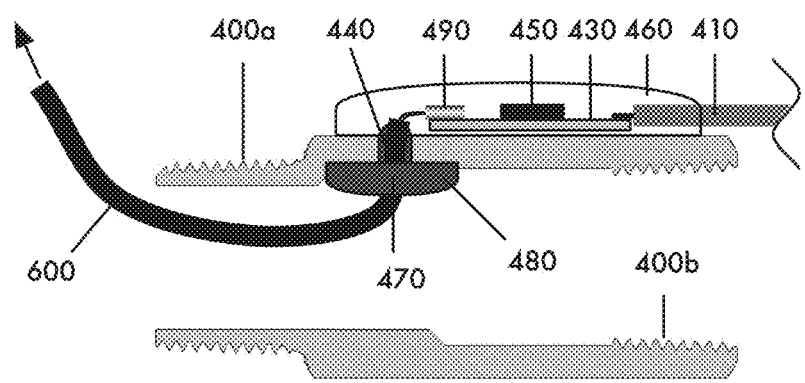
FIG. 10 shows a cross-sectional view of a universal enthalpy sensor fitting in accordance with an embodiment of the present disclosure.

FIG. 9 (top view) and FIG. 10 (cross section view) show details of the embodiment of universal sensor fitting 400 made out of extruded brass with machined externally-threaded port 400a and internally-threaded threaded port 400b. Small diameter hole 440 accommodates universal sensor 600. Plug 470 may be injection molded around universal sensor 600 using, for example, polymer or silicone material. Plug 470 can be easily pulled through small diameter hole 440 and forms a compression seal to offer a waterproof seal under low water pressure, and the disk-section 480 of plug 470 will be pushed against the fitting inner wall and will provide a waterproof seal under high water pressure.

Connecting wires are crimped in ferrules, such as ferrule 490, which are soldered on a printed circuit board (PCB) 430. PCB 430 also contains a temperature sensor chip 450 which meters the temperature of universal sensor fitting 400, which is a close approximation of a temperature of water at or near the top portion of hot water storage tank 500. This temperature measurement may be used to compensate for an excess length of universal sensor 600 at or near the top portion of hot water storage tank 500.

Additionally, as shown in FIGS. 9 and 10, PCB 430 may be bonded to universal sensor fitting 400 and connects to connecting wires of universal sensor cable 410. The electronics associated with PCB 430 may be sealed with waterproof epoxy sealant 460 to protect them from water, humidity and condensation.

FIGS. 11-15 show aspects of the disclosure pertaining to techniques for monitoring and using measurements taken by an enthalpy sensor in tank.

Figure 11:
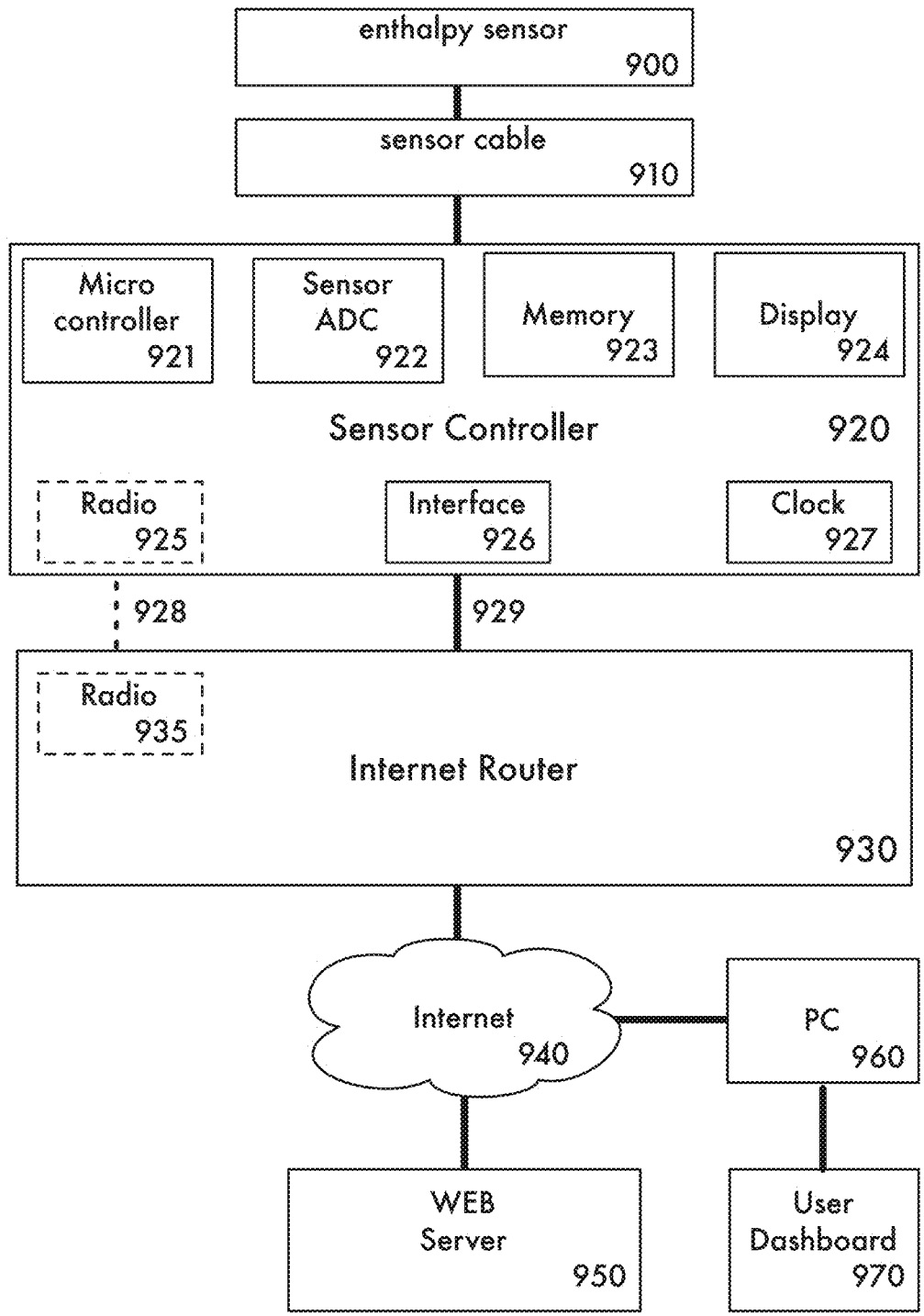
FIG. 11 depicts a block diagram of an enthalpy sensor in electrical and networked communication with a sensor controller and system dashboard module in accordance with an embodiment of the present disclosure.

FIG. 11 depicts a block diagram of a thermal energy metering system, such as the Ohm Monitoring System by Sunnovations Inc. of McLean, Va. Enthalpy sensor 900 (e.g., elongated enthalpy sensor 340 or universal sensor 600) is electrically coupled to sensor cable 910 (e.g., with a sensor cable 350 or universal sensor cable 910). Sensor cable 910 is electrically coupled to sensor controller 920 (or sensor controller 700), which provides a known electrical signal to one end of the sensor wire. Sensor cable 910 carries signals (e.g., analog signals) that pass from a second end of the sensor wire in enthalpy sensor 900 and provides them to sensor controller 920. Sensor controller 920 has an analog-to-digital converter (ADC), such as a high-resolution (e.g., 24-bit) ADC 922. In other embodiments, a lower-resolution (e.g., 10-bit or 12-bit) ADC may be used. ADC 922 converts analog signals from sensor cable 910 to digital signals for further digital signal processing within sensor controller 920. The signals are used to determine the resistance, e.g., in ohms, and to measure changes in the resistance over time.

In some embodiments, sensor controller 920 may also include an oscillator or clock, such as clock 927, for generating a clock signal, measuring time intervals, or measuring current local time. For example, sensor controller 920 may process measurements received from enthalpy sensor 900 at periodic intervals. The intervals may be fixed periods, such as one measurement per second, per two seconds, per five seconds, per ten seconds, etc., as desired.

Sensor controller 920 may further comprise one or more processors, such as microcontroller 921, which may be configured to operate according to instructions from one or more non-transitory processor readable storage media, such as memory unit 923. Sensor controller 920 may be configured to receive firmware updates to firmware instructions stored in memory unit 923. Sensor controller 920 may receive firmware updates in any of a variety of techniques. For example, firmware updates may be applied manually using a tangible medium over a wired interface, or over-the-air firmware updates may be received automatically over a network via router 930. In some embodiments, memory unit 923 may be configured for storing measurements or calculations. In other embodiments, a different memory unit (not shown) may be provided for storing measurements or calculations. While the term "microcontroller" is used here, the processing unit for the sensor controller could include any form of general purpose or specific purpose processing circuitry, including application-specific integrated circuits, that can carry out the types of functions identified (although a system would need not include every function described herein).

Sensor controller 920 may comprise display 924 for displaying data, such as recent measurements or calculations. Display 924 can be a digital display, analog gauge, interactive touch screen, or any visual means for conveying data. For example, an analog meter could be used to show average temperature of fluid in a tank directly, or the energy stored in the tank, comparable to a display showing the energy available in a battery.

In some embodiments, sensor controller 920 connects to a networking device, such as router 930, for providing network connectivity. Sensor controller 920 may comprise wired interface 926 to connect to router 930 via wired connection 929, or sensor controller 920 may comprise sensor radio 925 to connect to router radio 935 via wireless connection 928.

Network connectivity to a network, such as Internet 940, may be provided via any type of network connection, such as a wired connection or wireless connection. In some embodiments, router 930 may provide connectivity to a local area network (LAN), private network, cellular network (e.g., 4G or LTE networks), cloud service, or any other type of network. Networked devices, such as web server 950, personal computer 960, or other devices such as smartphones or tablets, may access information from sensor controller 920 via the network, such as Internet 940. In other embodiments, a device, such as personal computer 960, may be connected (via wired or wireless connection) directly to an interface of sensor controller 920 or to an interface of router 930.

User dashboard 970, which may be a web application, software application (e.g., smartphone app), or other user interface, may provide information or other data communicated to user dashboard 970 from sensor controller 920 via Internet 940 or otherwise. Access to user dashboard 970 may require user authentication, such as a username and password. Information provided by sensor controller 920 may be protected, such as by an encryption security protocol. Communications or other transmission of information between sensor controller 920 and user dashboard 970 may also be encrypted or otherwise protected by a security protocol.

It may be beneficial to provide insight in the full energy balance of such system without the need to meter each energy source independently. For example, in a tank used in a solar hot water system there are typically two sources that supply energy: solar and auxiliary/backup (e.g., electric, gas, oil, etc.), and there are typically two sources that consume energy: hot water usage and losses (e.g., energy losses to the environment and similar). It may be desirable to know which source or sources may be attributable to measured energy changes.

In some embodiments, microcontroller 921 is configured to operate so as to attribute energy gain to one or more sources, such as solar power ("Solar"), or auxiliary or backup power ("Auxiliary" or "Aux"); and to attribute loss to use or load ("Load"), or to loss such as to the surrounding environment ("Loss"). In other embodiments, sensor controller 920 may provide unprocessed data, including data related to energy gain or loss to a connected device (e.g., web server 950 via Internet 940) for processing by the device, such as to attribute the energy gain or loss to one or more sources.

Figure 12:
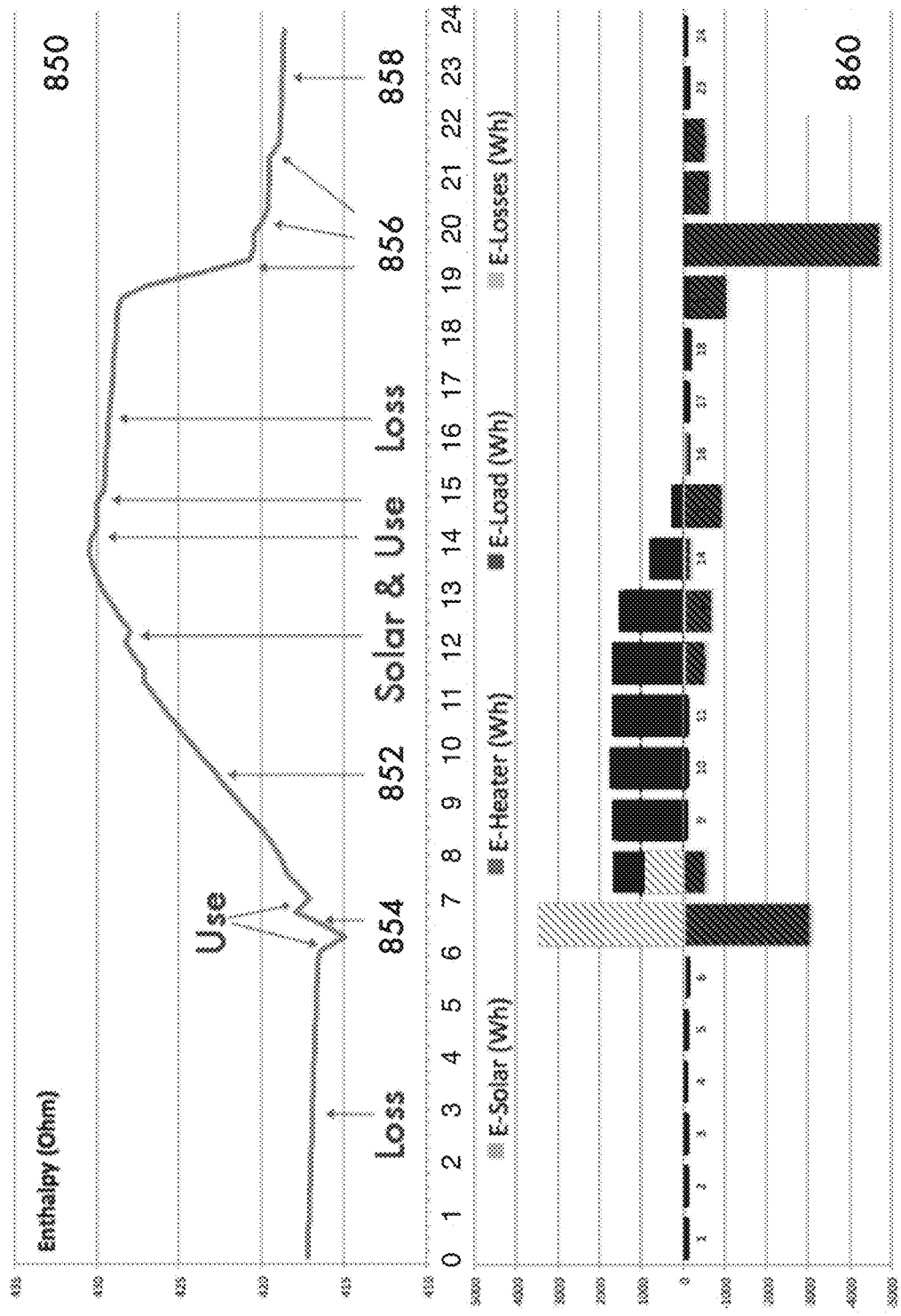
FIG. 12 shows an enthalpy graph slope analysis in accordance with an embodiment of the present disclosure.

FIG. 12 shows how the analyses of the changes in the slope of measurements from an enthalpy sensor can be used to determine which energy source or sources caused a particular change in slope (i.e., an energy "event"). For example, a relatively small increase in the slope constitutes enabling of solar input, a relatively large increase in the slope constitutes enabling of an auxiliary/backup energy input, and a relatively large decrease in the slope constitutes beginning of hot water usage. Energy loss is ongoing at any time, and the amount of ongoing loss may be calibrated during periods of time when no other energy source is active/enabled.

FIG. 12 shows an example of an energy chart that may be displayed via user dashboard 970. The (horizontal) x-axis of the energy chart represents a period of time over which sensor controller 920 monitored measurements from enthalpy sensor 900. The (vertical) y-axis for the top portion 850 of the energy chart represents the total enthalpy in a tank such as hot water storage tank 500. The total enthalpy may be represented in any of several units of either resistance (e.g., ohms) or thermal energy (e.g., joules, calories, etc.). The top portion 850 of the energy chart provides a line chart showing the change in total enthalpy over time.

Bottom portion 860 of the energy chart shows a stacked bar chart representation of the one or more sources attributed to periods of energy gain and loss, such as "E-Solar" (i.e., Solar), "E-Heater" (i.e., Aux), "E-Load" (i.e., Use), and "E-Losses" (i.e., Loss). The y-axis of bottom portion 860 represents the amount of energy gained or lost in, e.g., watt-hours (Wh). The total contribution of each source may be combined to indicate total energy production and consumption, similar to a typical kilowatt-hour (kWh) electricity meter for an electric utility company.

To attribute sources to energy gains and losses in a tank, sensor controller 920 may analyze the rate of change of enthalpy in the tank (i.e., the slope of the line charted in top portion 850 of the energy chart). Top portion 850 of the energy chart has been annotated to show periods of time during which sensor controller 920 attributed changes in total enthalpy to particular sources. For example, a relatively small positive slope 852 (i.e., a relatively slow increase in energy over time) indicates solar input. A relatively large positive slope 854 (i.e., a relatively fast increase in energy over time) indicates auxiliary input. A relatively large negative slope 856 (i.e., a relatively fast decrease in energy over time) indicates load/use. A relatively small negative slope (i.e., a relatively slow decrease in energy over time) indicates tank losses. The relative values can be established using approximate thresholds stored in memory and comparisons to measured values implemented by processing, e.g., by memory 923 and microcontroller 921 of sensor controller 920 (FIG. 11).

Sensor controller 930 may be configured to account for situations where multiple events simultaneously occur, such as solar production and load at the same time. For example, sensor controller 920 may recognize that a particular range of rates of change represent particular combinations of attributable sources. As described in detail below, sensor controller 920 may also recognize changes in the rate of change of energy (i.e., changes in the slope, or the derivative, of the line chart in top portion 850 of the energy chart), to recognize transitions from a first set of attributable sources to a second set of attributable sources. As described above, these events that represent changes in energy sources can be graphed over time using a stacked bar chart as shown in bottom portion 860 of the energy chart.

Figure 13:
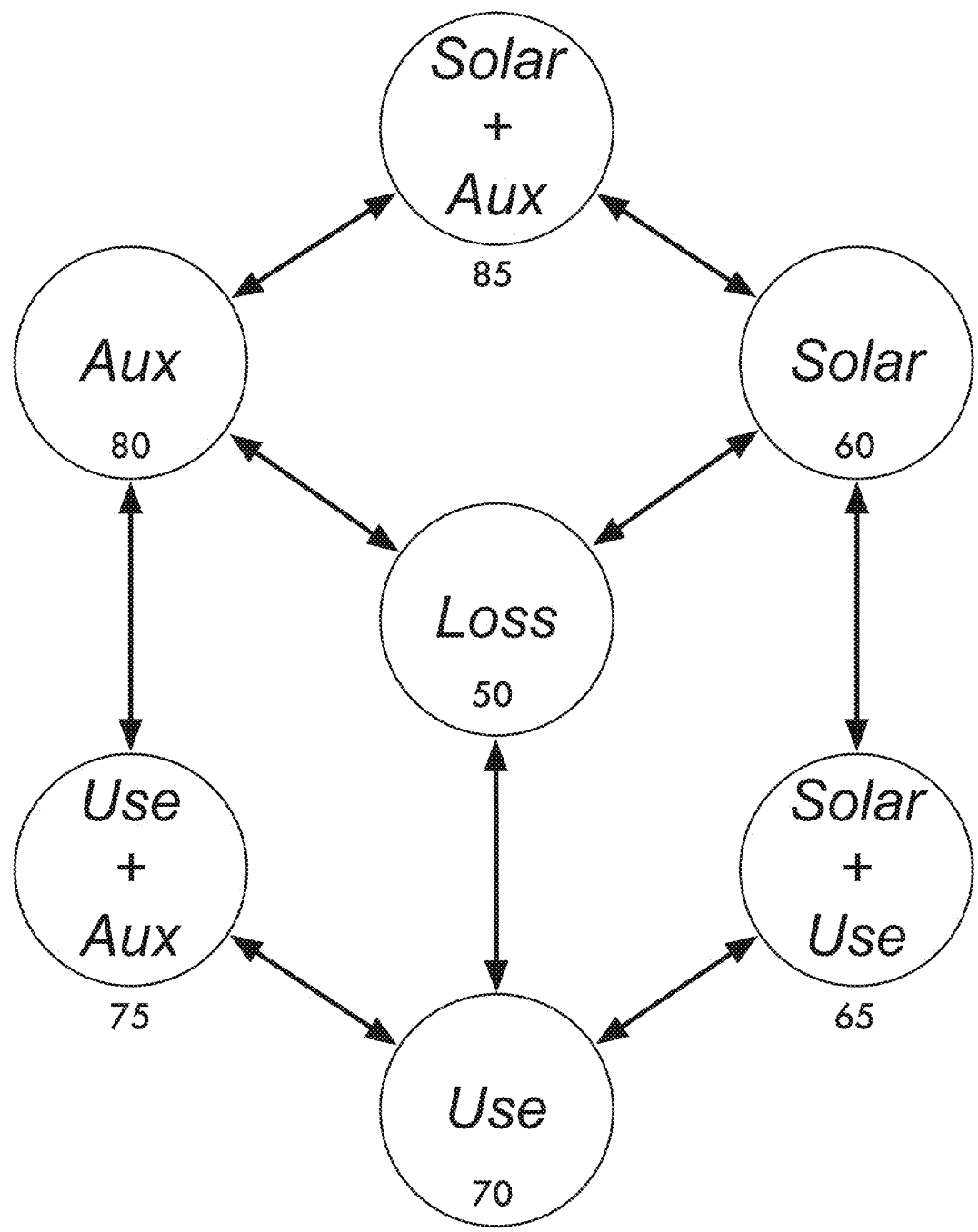
FIG. 13 shows a finite-state machine diagram in accordance with an embodiment of the present disclosure.

To accurately meter energy per energy source, the system may determine which energy source or sources are active. FIG. 13 represents a finite-state machine diagram, which is one way to keep track of which state the system is in and to which states the system can change upon a triggering event such as a detected slope change.

Figure 14:
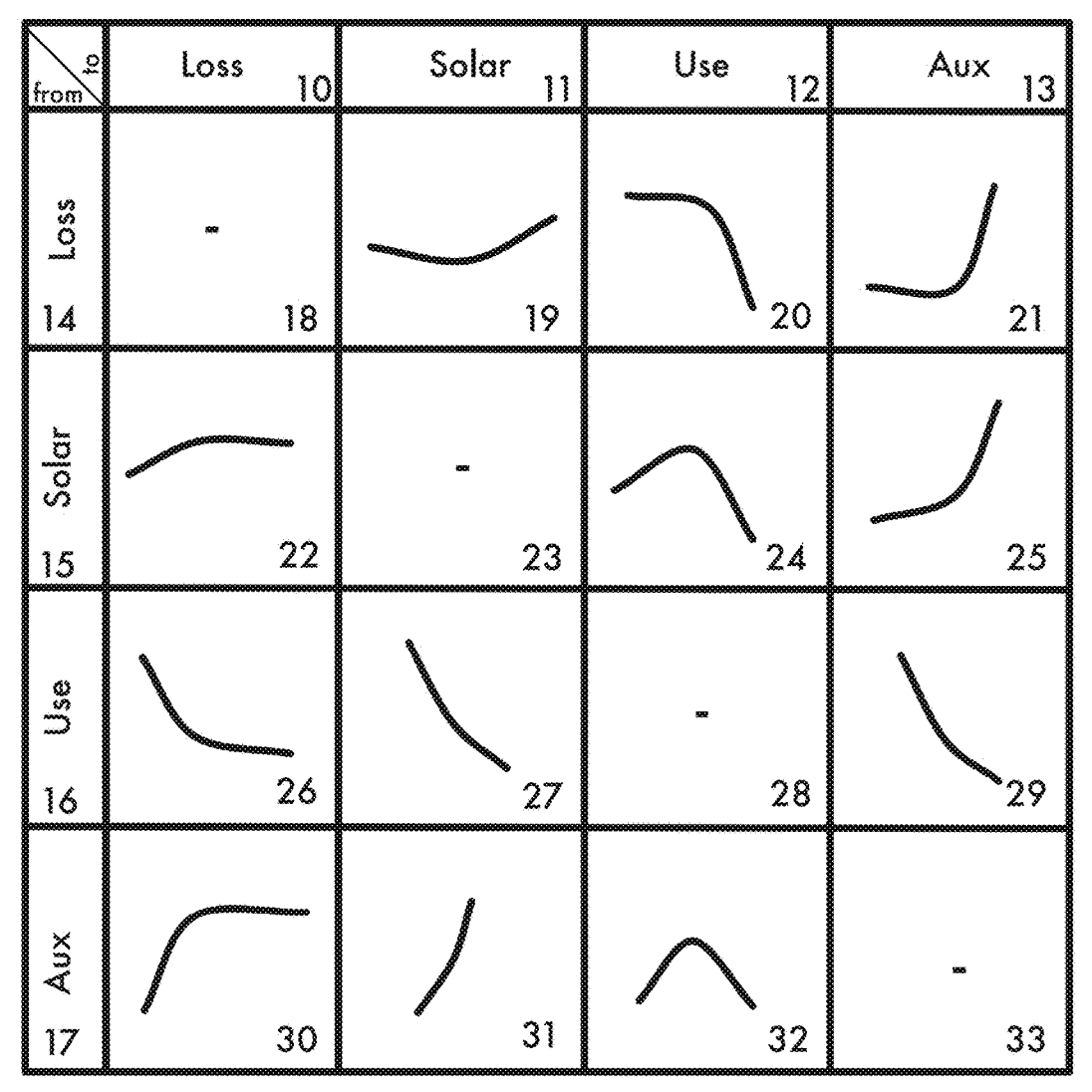

FIG. 13 depicts a finite-state machine diagram to illustrate the analysis applied by the sensor controller 920 to recognize transitions from one or more sources of energy gain or loss to a different set of one or more sources of energy gain or loss. As a finite-state machine, sensor controller 920 may identify that a solar-powered hot water storage system is in on particular state (e.g., Loss state 50 or Solar state 60) at a given time. Changes or transitions from one state to another state are triggered by specific events which are described in detail below with reference to FIG. 14. FIGS. 13 and 14 are merely exemplary for illustrative purposes; for example, in some embodiments, additional states and transitions may be identified.

If hot water in a tank is not in use, and no energy is added by Solar or Aux energy sources, the system will be in Loss state 50. If a modest increase in the slope of the enthalpy sensor is detected, the state may change from Loss state 50 to Solar state 60, while a steep slope change may trigger a change from Loss state 50 to Aux state 80. Hot water usage from the tank will result in a steep slope drop, which may trigger a state change from Loss state 50 to Use state 70. Additional or secondary events can take place, each triggered by specific events within the context of a given state. In FIG. 13, examples of states with secondary events include Use-plus-Aux state 75, Solar-plus-Use state 65, and Solar-plus-Aux state 85. Energy loss to the surrounding environment is ever-present; each state accounts for this loss in addition to the events (e.g., Solar) that occur in a particular state (except for Loss state 50, which represents the state in which no events other than Loss are occurring).

FIG. 14 shows a simplified matrix representation of which changes in the slope of the enthalpy result in state changes from one state to another due to an event. The rows of the matrix represent the initial ("from") event: Loss initial event 14, Solar initial event 15, Use initial event 16, and Aux initial event 17. The columns of the matrix represent the subsequent ("to") event that results in a transition to a different state: Loss subsequent event 10, Solar subsequent event 11, Use subsequent event 12, and Aux subsequent event 13.

Each cell of the matrix from one initial state to a (different) subsequent state depicts the approximate change in slope (i.e., rate of change of enthalpy) that represents the transition from the initial state to the different subsequent state. For example, cell 19 represents a transition from a state with Loss initial event 18 to Solar subsequent event 11 (i.e., an approximate change of slope that may appear on the energy chart of FIG. 12 during a transition from Loss state 50 to Solar state 60 in the finite-state machine diagram of FIG. 13). In the example of cell 19, the curve in cell 19 begins as a gradual decrease in total enthalpy, attributable to loss. In the center of the curve in cell 19, the slope changes to a gradual increase in total enthalpy, attributable to solar input becoming enabled (and accounting for continued, ever-present loss to the surrounding environment).

Table I summarizes the cells in the matrix and the events and state transitions that each cell represents:

TABLE I

Summary of FIG. 14 State Transitions

| CELL | INITIAL STATE | SUB-SEQUENT STATE | DESCRIPTION OF RATE CHANGE | DESCRIPTION OF EVENT |
|---|---|---|---|---|
| 18 | Loss (50) | Loss (50) | No change | No event |
| 19 | Loss (50) | Solar (60) | Gradual decrease to gradual increase | Solar input begins |
| 20 | Loss (50) | Use (70) | Gradual decrease to rapid decrease | Hot water use begins |
| 21 | Loss (50) | Aux (80) | Gradual decrease to rapid increase | Auxiliary input begins |
| 22 | Solar (60) | Loss (50) | Gradual increase to gradual decrease | Solar input ends |
| 23 | Solar (60) | Solar (60) | No change | No event |
| 24 | Solar (60) | Solar + Use (65) | Gradual increase to somewhat rapid decrease | Hot water use begins while solar input enabled |
| 25 | Solar (60) | Solar + Aux (85) | Gradual increase to very rapid increase | Auxiliary input begins while solar input enabled |
| 26 | Use (70) | Loss (50) | Rapid decrease to gradual decrease | Hot water use ends |
| 27 | Use (70) | Solar + Use (65) | Rapid decrease to somewhat rapid decrease | Solar input begins while hot water being used |
| 28 | Use (70) | Use (70) | No change | No event |
| 29 | Use (70) | Use + Aux (75) | Rapid decrease to less rapid decrease | Auxiliary input begins while hot water being used |
| 30 | Aux (80) | Loss (50) | Rapid increase to gradual decrease | Auxiliary input ends |
| 31 | Aux (80) | Solar + Aux (85) | Rapid increase to very rapid increase | Solar input begins while auxiliary input enabled |
| 32 | Aux (80) | Use + Aux (75) | Rapid increase to less rapid decrease | Hot water use begins while auxiliary input enabled |
| 33 | Aux (80) | Aux (80) | No change | No event |

Cells 18, 23, 28, and 33 do not depict a change in slope because there is no event and thus no transition from one initial state to a different subsequent state. For example, cell 18 occupies the position in the matrix from Loss initial event 14 (i.e., begins in Loss state 50) to Loss subsequent event 10 (i.e., remains in Loss state 50). Because no different event and no state transition occurred, there is no change in the rate of change of total enthalpy to attribute to an event.

As explained above, the matrix of FIG. 14 is merely exemplary for illustrative purposes; other finite-state machine states and transitions may be detected that are not depicted in FIG. 14. A system need not necessarily detect all of the states described above but could determine just Solar versus Aux, or Use versus Loss. Additionally, the curves in each cell and description of the relative rates of each slope and change in slope are approximations for illustrative purposes and not drawn to scale. For example, in some embodiments, sensor controller 920 may be configured with a range of threshold slope changes to represent each possible event and state transition.

Accurate detection of the timing of the slope changes and automated setting of threshold values may improve the accuracy of interpreting the slope changes as changes in energy sources and drains. In other embodiments, sensor controller 920 may be configured to adjust range or threshold values automatically to adapt to actual operating conditions in response to calibration routines, system testing, other input data during use, and so on. For example, in some embodiments, sensor controller 920 may receive notifications via an electrical interface that an auxiliary energy source has been enabled or disabled, in which case sensor controller 920 may correlate the notifications to measured slope changes and adapt the range or threshold values for the auxiliary event accordingly.

In still other embodiments, one or more absolute temperature sensors (not shown) may be placed throughout hot water storage tank 500. For example, a relatively fast rise in temperature as measured by an absolute temperature sensor connected to hot water outlet 520 may also indicate a hot water use/consumption event. Additionally, a relatively high temperature as measured by an absolute temperature sensor connected to a solar collector portion (not shown) of the solar hot water system may also indicate a solar event (e.g., thermal energy production attributable to solar heating sources).

Figure 15:
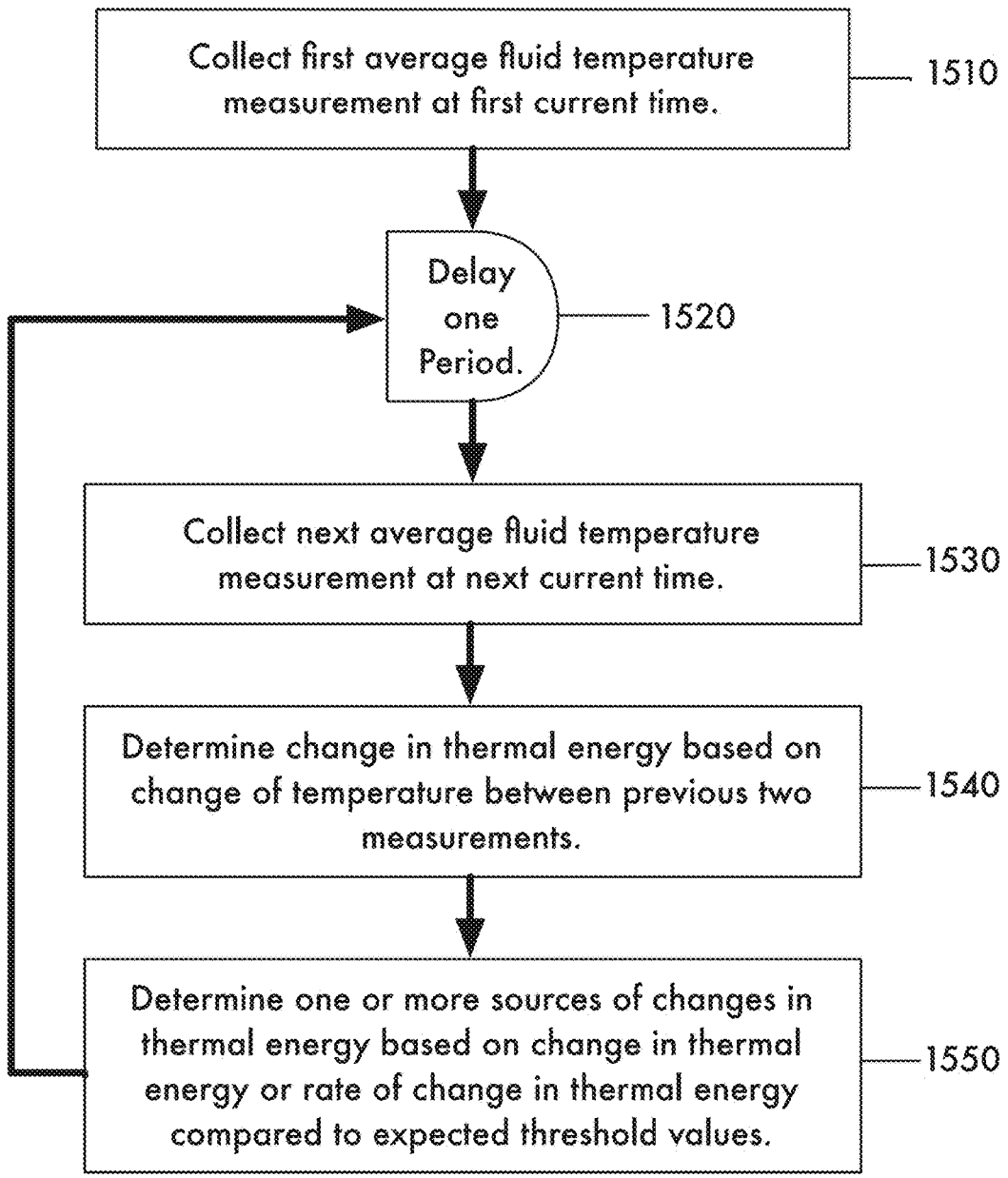
FIG. 15 depicts a method for thermal energy metering with an enthalpy sensor in accordance with an embodiment of the present disclosure.

Referring to FIG. 15, an exemplary method collects a first temperature measurement at a first current time at Step 1510. The system enters a loop, waiting for the duration of one period to pass at Step 1520 and collecting another temperature measurement at the next current time at Step 1530. The system can process at least the previous two temperature measurements and compute a corresponding change in thermal energy over that time period at Step 1540. The system can compute one or more sources of changes in thermal energy at Step 1550 based on the change in thermal energy (or rate of change of thermal energy) calculated at Step 1540 by, e.g., comparing the change in thermal energy to threshold values for various sources of changes in thermal energy. The system can also store or transmit any type of data (e.g., temperature and time measurements, thermal energy calculations, thermal energy source attributions, etc.) during or after any step.

In some embodiments, the system computes the sources of changes in thermal energy based on the previous measurements at Step 1550 and then returns to Step 1520 to wait for the current period to elapse and collect another measurement. In other embodiments, such as in systems with parallel processing capabilities, they system loops over Steps 1520 and 1530 continuously while simultaneously looping over Steps 1540 and 1550 to process the data from memory as it is collected. In other embodiments, the system loops over Steps 1520 and 1530 for a number of periods over a course of time such as an hour, a day, or a month, and then transmits a collection of measurements over a wired or wireless network (e.g., Internet 940) to a co-located or remotely-located part of the system (e.g., within sensor controller 920, web server 950, personal computer 960, etc.) that subsequently loops over Steps 1540 and 1550 to process the collection of measurements.

The system can be further configured to determine whether a particular measurement is erroneous because, for example, it appears to be an outlier. The system can discard measurements determined to be erroneous and use the measurements preceding and following the discard measurement to compute more accurate changes in thermal energy at Step 1540.

Frequent metering of relatively small energy changes over short time intervals at Steps 1520 and 1530 allow the system to compute the thermal energy delivered to or taken from the tank nearly instantaneously at Step 1540. The total amount of thermal energy delivered to the tank in a given time period can also be tracked over regular time intervals (e.g., per hour or day), thus allowing metering of solar thermal production in a given time interval, (e.g., on a given day).

At Step 1550, the system can also determine whether thermal energy is supplied from solar or auxiliary/backup (e.g., electrical or gas heating) sources by analyzing the rate of change in average temperature of the fluid in the tank as measured by the temperature sensor as explained in detail above with respect to FIGS. 12-14. A relatively slow and small increase can be attributed to solar contribution, whereas a relatively fast and large increase can be attributed to auxiliary/backup sources or a combination of solar and auxiliary/backup sources.

Similarly, a relatively slow and small decrease can be attributed to ambient thermal energy losses. A relatively fast and large increase can be attributed to hot water use/consumption or a combination of hot water use/consumption and ambient losses. In some embodiments, the system can learn what the typical, ever-present energy loss is at given tank and ambient temperatures so it can be used to adjust the proportion of thermal energy contribution or consumption attributable to heating sources or hot water use/consumption, respectively, at Step 1550.

Additionally, the system can also determine if hot water production and consumption takes place at the same time based on the typical rates of change in sensor resistance or temperature attributable to production or consumption alone at Step 1550. For example, in some embodiments, a change in thermal energy can be attributed in part to a solar or backup heating contribution and another part to hot water consumption or ambient losses.

The data that is derived from the rate of change of thermal energy of the fluid in the tank at Steps 1540 and 1550 can be used for monitoring purposes to make sure that the hot water system is functioning properly, for monitoring for statistical purposes, and for monitoring for billing or metering purposes.

In the case for monitoring for proper functioning, one of more thresholds could be established to determine whether a parameter has changed by a significant enough amount that would warrant attention to the system. Thus, a processing unit could compare incoming data to one or more thresholds and provide an alert or alarm if, for example, the measured average temperature, the computed rate of change of average temperature, or the computed rate of change of thermal energy falls above or below a specified threshold or falls outside a specified range.

The alert can be transmitted (e.g., via router 930 over Internet 940) to any recipient (e.g., web server 950 or personal computer 960). For example, in some embodiments, the alert can be transmitted to a system owner, a temperature sensor system vendor, or a solar system installer who can schedule a maintenance visit based on the alert.

For other forms of monitoring, the data that is generated can be compared to other data that is used for other forms of providing thermal or electrical energy for statistical purposes or to generate reports of thermal energy generation and usage. The system can log temperature information over time and generate graphs and charts depicting thermal energy production or consumption. For billing or metering purposes, the changes in thermal energy can be used to calculate an amount to be charged to a user. For example, the system can charge a user based on the decrease in thermal energy attributed to hot water consumption, or the system can charge a user one rate for hot water consumed during periods of the day when hot water can be produced from solar energy and a second rate for hot water consumed during periods of the day when hot water must be produced from backup sources such as electric or gas heating.

Figure 16:
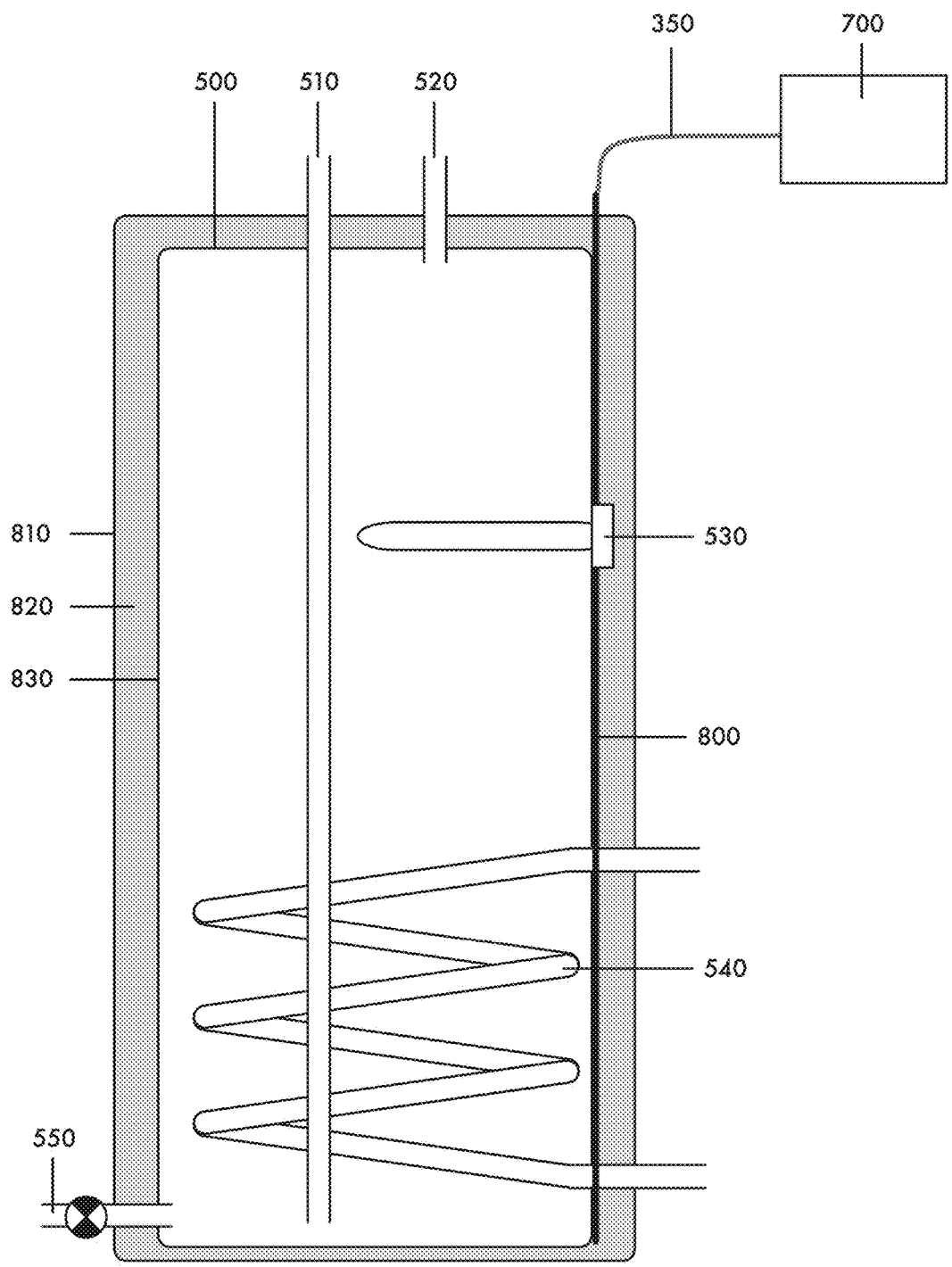
FIG. 16 shows a schematic representation of a tank with an enthalpy sensor in another configuration accordance with another embodiment of the present disclosure.

The embodiments described herein are merely exemplary, and other embodiments—including other configurations and fittings for enthalpy sensors—are possible. For example, FIG. 16 shows another embodiment of an enthalpy sensor, exterior sensor 800, which is configured for application to outer wall 830 of a tank. Outer wall 830 of a tank is typically composed of steel, but exterior sensor 800 may be configured to apply or attach to outer walls of tanks composed of other materials. In some embodiments, exterior sensor 800 may be attached to a tank by an adhesive (e.g., glue or tape; not shown). Exterior sensor 800 may be designed for easy and low-cost application during manufacturing of a tank or for retrofitting an existing tank. Additionally, exterior sensor 800 may not require extensive waterproofing elements as exterior sensor 800 is outside the water body. Exterior sensor 800 is configured to measure changes in tank temperature accurately. For example, a steel composition for outer wall 830 would cause the temperature of outer wall 830 to follow the temperature of the fluid inside the tank accurately.

Other embodiments may be configured for multi-tank systems (not shown). For example, a typical multi-tank system may use two tanks (e.g., a primary tank and a separate, backup tank). In two-tank systems, two enthalpy sensors (e.g., elongated enthalpy sensor 340 or universal enthalpy sensor 600) may be used, with one enthalpy sensor place in each of the two tanks. Energy gain or loss may be analyzed for each tank individually and then combined (e.g., summed). In other embodiments, energy data from more than two tanks may be combined using an enthalpy sensor in each of the more than two tanks.

Households and other users of solar hot water systems benefit from the cost-savings and environmental-friendliness of renewable solar energy. Organizations such as the Solar Rating and Certification Corporation have developed metrics for assessing the effectiveness of solar hot water systems. In particular, Solar Fraction is a computer-modeled measure of a system's thermal performance, which is used by the Solar Rating and Certification Corporation to rate solar thermal systems. The formula to compute Solar Fraction is:

$$\text{Solar Fraction} = \text{Solar}/(\text{Use} + \text{Loss})$$

Conventional metering techniques for solar hot water systems typically do not measure Solar Fraction or Solar Rating. Solar Fractions of conventional solar hot water systems were typically estimated based on computer-modeled simulation data. However, embodiments of the present disclosure, including the Ohm Monitoring System, can measure an actual Solar Fraction of a solar hot water system in real time. According to another embodiment of the disclosure, sensor controller 920 or a similar device may calculate the Solar Fraction of a solar hot water system. As explained above with reference to FIGS. 12-15, sensor controller 920 can measure the input parameters of the Solar Fraction formula: Solar, Use, and Loss. For example, at the end of a sunny day, the Solar Fraction of a solar hot water system may be high. When hot water is used, the Solar Fraction will decrease.

Figure 17:
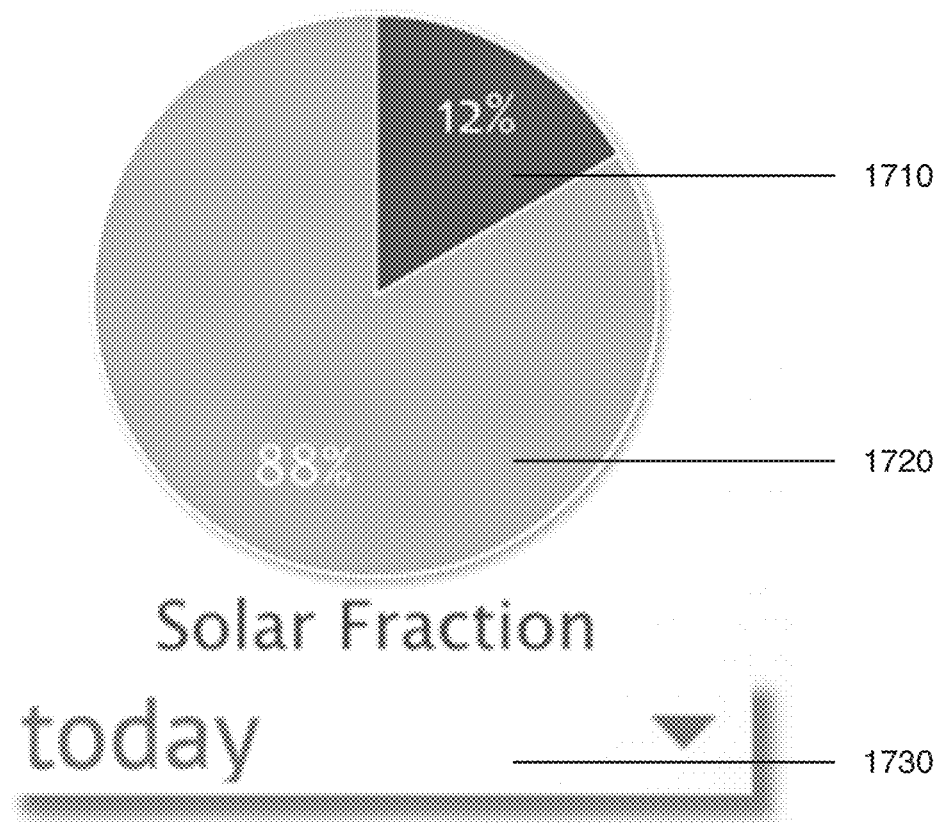
FIG. 17 shows a solar fraction gauge in accordance with an embodiment of the present disclosure.

FIG. 17 shows an example of a solar gauge, for displaying the Solar Fraction 1720 of a solar hot water system. In some embodiments, the solar gauge may be a pie chart as shown in FIG. 17, presented to a user via user dashboard 970 or any other visual interface. In other embodiments, a solar gauge may be an analog representation of Solar Fraction 1720 on a solar hot water system's tank.

The solar gauge may be displayed with a default time period (e.g., "today," for the current calendar day). In some embodiments, the solar gauge may include a time period selection widget for changing the period of time to use for calculating Solar Fraction 1720 (e.g., 88%). The solar gauge may also display the non-solar remainder 1710 (e.g., 12%).

The Solar Fraction formula used by the Solar Rating Certification Corporation does not account for changes in energy attributable to a backup/auxiliary energy source. In some embodiments, sensor controller 920 or a similar device may use a modified formula to calculate solar energy ratios that account for other energy sources including backup/auxiliary energy sources. Switching to a solar rating based modified solar fraction that accurately differentiates between solar energy and other potentially costly backup sources of energy could promote more efficient and environmentally-friendly systems.

The systems described here can eliminates the need for a flow meter in the solar loop (although flow meters could be used additionally). Instead, the system uses an enthalpy sensor to monitor the enthalpy of the solar hot water tank accurately. The enthalpy sensor is designed to be easy to install initially (e.g., at the time a tank is manufactured or installed) or in a retrofitted manner (e.g., in previously installed and operational tanks), can have lower cost less than conventional systems based on flow meters, and can perform favorably when compared to a conventional flow rate-based heat meter, with over 98% accuracy.

The system described here can provide one or more of the following advantages over conventional flow rate-based heat meters:
- Measures solar energy production, backup (auxiliary) energy production, and energy consumption (e.g., hot water use and environmental loss)
- Built for simple, do-it-yourself (DIY) installation
- Configured for wireless, "plug-and-play" connectivity
- Offers dashboard interface showing available solar-heated water and other helpful system information
- Designed for compatibility with nearly all commercial residential solar hot water systems In particular, the system uses measurements from the enthalpy sensor to translate the measurements into usable energy data so that customers know how much of the energy they use is attributable to solar power.

Although the embodiments above are described primarily in the context of solar hot water storage systems or other how water storage systems, the disclosure is not limited to hot water storage systems or solar hot water storage systems. Other embodiments include enthalpy sensors (e.g., elongated enthalpy sensor 340 (FIG. 2), universal enthalpy sensor 600 (FIG. 7), external enthalpy sensor 800 (FIG. 16), etc.) configured for thermal energy metering of storage tanks for storing fluids other than water or other matter, or configured for thermal energy metering of a discrete thermal mass other than a storage tank (e.g., a concrete block or other discrete mass).

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system comprising: an elongated sensor wire having a first end and a second end, wherein the elongated sensor wire has a material resistivity configured to prevent internal heat-up of the elongated sensor wire; a jacket, surrounding at least a portion of the elongated sensor wire, the jacket having a first end and a second end; wherein the elongated sensor wire within the jacket extends from the first end of the elongated sensor wire down a length of the jacket and back up the length of the jacket at least one time, such that the first and second ends of the elongated sensor wire are at the first end of the jacket; and a processor electrically coupled to the elongated sensor wire, the processor configured to provide electrical signals to the first end of the elongated sensor wire and sense signals from the second end of the elongated sensor wire to determine a resistance of the elongated sensor wire at a point in time, and to determine changes in the resistance of the elongated sensor wire over a period of time, wherein a sensitivity of determining the changes in the resistance of the elongated sensor wire over the period of time is based on the material resistivity.

2. The system of claim 1, wherein the processor determines changes in thermal energy of a discrete thermal mass based on the changes in the resistance of the elongated sensor wire.

3. The system of claim 2, wherein the discrete thermal mass is a fluid storage tank.

4. The system of claim 3, further comprising a flotation device, connected to an upper portion of the jacket, for positioning the upper portion of the jacket within an upper portion of the fluid storage tank.

5. The system of claim 3, further comprising a weight, connected to a lower portion of the jacket, for positioning the lower portion of the jacket within a lower portion of the fluid storage tank.

6. The system of claim 3, further comprising: a fitting for mounting in a port of the fluid storage tank; and an electrical connection for electrically coupling the elongated sensor wire and the processor.

7. The system of claim 6, wherein the fitting further comprises:
- a first port for attachment to a temperature-and-pressure port of the tank; and
- a second port for attachment to a temperature-and-pressure valve of the tank.

8. The system of claim 2, further comprising an adhesive for attaching at least a portion of the jacket to an exterior surface of the discrete thermal mass.

9. The system of claim 3, further comprising a fitting for installing the elongated sensor wire within the fluid storage tank, the fitting forming a seal with the jacket for protecting the elongated sensor wire from a fluid stored within the fluid storage tank.

10. The system of claim 1, wherein the elongated sensor wire has an insulating coating, and further comprising a silicone insulation around the elongated sensor wire and the insulating coating and within the jacket.

11. A system comprising: a first elongated wire having a first end and a second end and a first resistivity, the first resistivity configured to prevent internal heat-up of the first elongated sensor wire; a jacket, surrounding at least a portion of the first elongated wire, the jacket having a first end and a second end and a length exceeding a height of a tank; and a processor electrically coupled to the first end of the first elongated wire, the processor configured to determine changes in thermal energy of the tank based on a change in a resistance of the first elongated wire, wherein a sensitivity of determining the change in the resistance of the first elongated wire is based on the first resistivity; wherein the length of the jacket exceeds a height of the tank by an amount, and wherein the processor is configured to compensate for the amount by which the length of the jacket exceeds the height of the tank using a temperature measurement.

12. The system of claim 11, wherein the jacket has a density less than a density of a fluid in the tank so that a portion of the jacket that exceeds the height of the tank is capable of floating in an upper portion of the fluid in the tank.

13. The system of claim 12, further comprising a temperature sensor configured to sense a temperature of the upper portion of the fluid in the tank, wherein the processor is further configured for compensating for the amount by which the length of the jacket exceeds the height of the tank based at least in part on the temperature of the upper portion of the fluid in the tank.

14. The system of claim 11, further comprising: a second elongated wire, within the jacket, having a first end and a second end, the second elongated wire having a second resistivity less than the first resistivity; wherein the second end of the first elongated wire is electrically connected to the second end of the second elongated wire; wherein the processor is electrically coupled to the first end of the second elongated wire; wherein the processor is configured for providing electrical signals to the first end of one of the first and second elongated wires, and for sensing signals from the first end of the other of the first and second elongated wires; and wherein the processor is further configured for compensating for the second resistivity of the second elongated wire.

15. The system of claim 14, wherein only one of the first and second elongated wires has an insulating coating.

16. The system of claim 11, further comprising a weight configured to hold the second ends of the wires at a lower portion of the tank.

17. A system comprising: an elongated sensor wire having a first end and a second end, wherein the elongated sensor wire has a material resistivity configured to prevent internal heat-up of the elongated sensor wire; a processor electrically coupled to the elongated sensor wire configured to provide electrical signals to the first end of the elongated sensor wire and sense signals from the second end of the elongated sensor wire to determine a resistance of the elongated sensor wire and to determine rates of changes in the resistance of the elongated sensor wire, wherein a sensitivity of determining the rates of changes in the resistance of the elongated sensor wire is based on the material resistivity; wherein the processor is configured to: receive periodic measurements from the elongated sensor wire; compare the rates of change in the resistance to a first threshold, and to determine, based on a comparison to the first threshold, one of at least two different causes for an increase or a decrease in resistance; provide a user-readable output indicating the cause for the increase or decrease.

18. The system of claim 17, wherein the processor is further configured to provide a user-readable output indicating an amount of thermal energy in a discrete thermal mass based at least in part on the rates of change in the resistance of the elongated sensor wire.

19. The system of claim 18, wherein the system is for sensing changes to the amount of thermal energy of a fluid in a solar heating system such that the fluid can be heated with a solar energy source or with an auxiliary energy source, and wherein the processing unit determines whether an increase in the amount of thermal energy is due to the solar energy source or to the auxiliary energy source based on comparisons of a rate of increase to a first threshold.

20. The system of claim 18, wherein the system is for sensing changes to the amount of thermal energy of a fluid in a solar heating system such that the fluid can be heated with a solar energy source or with an auxiliary energy source, and wherein the processor determines whether an increase in the amount of thermal energy is due to the solar energy source or to the auxiliary energy source based on comparisons of a rate of increase to a first threshold.

* * * * *